(12) United States Patent
Bauer et al.

(10) Patent No.: US 10,508,238 B2
(45) Date of Patent: Dec. 17, 2019

(54) HALOGEN-FREE SOLID FLAME RETARDANT MIXTURE AND USE THEREOF

(71) Applicant: CLARIANT INTERNATIONAL LTD., Muttenz (CH)

(72) Inventors: Harald Bauer, Kerpen (DE); Sebastian Hoerold, Diedorf (DE); Martin Sicken, Cologne (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 15/114,688

(22) PCT Filed: Jan. 19, 2015

(86) PCT No.: PCT/EP2015/000080
§ 371 (c)(1),
(2) Date: Jul. 27, 2016

(87) PCT Pub. No.: WO2015/113740
PCT Pub. Date: Aug. 6, 2015

(65) Prior Publication Data
US 2016/0340588 A1 Nov. 24, 2016

(30) Foreign Application Priority Data

Jan. 29, 2014 (DE) .................. 10 2014 001 222

(51) Int. Cl.
| | | |
|---|---|---|
| *C09K 21/12* | (2006.01) | |
| *C08K 3/32* | (2006.01) | |
| *C08K 5/5313* | (2006.01) | |
| *C08K 11/00* | (2006.01) | |
| *C09K 21/04* | (2006.01) | |

(52) U.S. Cl.
CPC ............... *C09K 21/12* (2013.01); *C08K 3/32* (2013.01); *C08K 5/5313* (2013.01); *C08K 11/00* (2013.01); *C09K 21/04* (2013.01)

(58) Field of Classification Search
CPC ........ C09K 21/12; C09K 21/04; C08K 11/00; C08K 3/32; C08K 5/5313
USPC ........................................................ 524/133
See application file for complete search history.

(56) References Cited

U.S. PATENT DOCUMENTS

| | | | |
|---|---|---|---|
| 3,900,444 | A | 8/1975 | Racky et al. |
| 4,036,811 | A | 7/1977 | Noetzel et al. |
| 5,256,718 | A | 10/1993 | Yamamoto et al. |
| 5,356,982 | A | 10/1994 | Razvan et al. |
| 5,780,534 | A | 7/1998 | Kleiner et al. |
| 5,965,639 | A | 10/1999 | Yamauchi et al. |
| 6,136,892 | A | 10/2000 | Yamauchi et al. |
| 6,207,736 | B1 | 3/2001 | Nass et al. |
| 6,255,371 | B1 | 7/2001 | Schlosser et al. |
| 6,270,560 | B1 | 8/2001 | Kleiner et al. |
| 6,365,071 | B1 | 4/2002 | Jenewein et al. |
| 6,509,401 | B1 | 1/2003 | Jenewein et al. |
| 7,179,400 | B2 | 2/2007 | Frischkemuth et al. |
| 7,255,814 | B2 | 8/2007 | Hoerold et al. |
| 7,446,140 | B2 | 11/2008 | Bauer et al. |
| 8,362,119 | B2 | 1/2013 | Endtner et al. |
| 8,551,371 | B2 | 10/2013 | Hawkes et al. |
| 9,481,831 | B2 | 11/2016 | Bauer et al. |
| 9,505,904 | B2 | 11/2016 | Bauer et al. |
| 10,202,549 | B2 | 2/2019 | Bauer et al. |
| 2003/0173544 | A1 | 9/2003 | Eichenauer |
| 2004/0225040 | A1 | 11/2004 | Hoerold |
| 2005/0288414 | A1 | 12/2005 | Frischkemuth et al. |
| 2006/0020064 | A1 | 1/2006 | Bauer et al. |
| 2006/0074157 | A1* | 4/2006 | Bauer ............... C07F 9/301 524/115 |
| 2006/0214144 | A1 | 9/2006 | Bauer et al. |
| 2006/0287418 | A1 | 12/2006 | Bauer et al. |
| 2008/0090950 | A1 | 4/2008 | Costanzi et al. |
| 2010/0224840 | A1 | 9/2010 | Hawkes et al. |
| 2011/0021676 | A1 | 1/2011 | Hoerold et al. |
| 2013/0190432 | A1* | 7/2013 | Krause ............ C08K 5/0008 524/101 |
| 2014/0309339 | A1 | 10/2014 | Schneider et al. |
| 2014/0309340 | A1 | 10/2014 | Schneider et al. |
| 2014/0329933 | A1 | 11/2014 | Schneider et al. |

(Continued)

FOREIGN PATENT DOCUMENTS

| | | |
|---|---|---|
| CA | 2246124 A1 | 8/1998 |
| CA | 2218792 C | 12/2001 |

(Continued)

OTHER PUBLICATIONS

International Search Report issued in related International Patent Application No. PCT/EP2012/004906 dated Feb. 4, 2013.
International Preliminary Report on Patentability issued in related International Patent Application No. PCT/EP2012/004906 dated Feb. 4, 2013.
International Search Report issued in related International Patent Application No. PCT/EP2011/004887 dated Mar. 26, 2012.
International Preliminary Report on Patentability issued in related International Patent Application No. PCT/EP2011/004887 dated Apr. 9, 2013.

(Continued)

*Primary Examiner* — Doris L Lee

(74) *Attorney, Agent, or Firm* — Morgan, Lewis & Bockius LLP

(57) ABSTRACT

A halogen-free flame retardant mixture containing between 1-99 wt. % of a component A and between 1-99 wt. % of a component B. Component A comprises between 85-99.995 wt.-% of a solid diethylphosphinic acid salt of the metals Mg, Ca, Al, Sb, SN, Ge, Ti, Fe, Zr, Zn, Ce, Bi, Sr, Mn, Li, Na, K and/or a protonated nitrogen base and between 0.005-15 wt.-% of non-combustible additives and component B is in the form of an aluminum phosphite.

10 Claims, No Drawings

(56) References Cited

U.S. PATENT DOCUMENTS

| | | | |
|---|---|---|---|
| 2014/0336325 A1* | 11/2014 | Bauer | C08K 3/32 524/414 |
| 2014/0350149 A1 | 11/2014 | Schneider et al. | |
| 2014/0371361 A1 | 12/2014 | Bauer et al. | |
| 2015/0005421 A1 | 1/2015 | Schneider et al. | |
| 2015/0005427 A1 | 1/2015 | Bauer et al. | |
| 2015/0018464 A1 | 1/2015 | Bauer et al. | |
| 2015/0299419 A1* | 10/2015 | Bauer | C01B 25/163 524/414 |

FOREIGN PATENT DOCUMENTS

| | | | |
|---|---|---|---|
| DE | 2252258 A1 | 5/1974 | |
| DE | 2447727 A1 | 4/1976 | |
| DE | 19614424 A1 | 10/1997 | |
| DE | 19734437 A1 | 2/1999 | |
| DE | 19737727 A1 | 7/1999 | |
| DE | 19920278 A1 | 11/2000 | |
| DE | 19933901 A1 | 2/2001 | |
| EP | 0344321 A1 | 12/1989 | |
| EP | 0699708 A2 | 3/1996 | |
| EP | 0838493 A1 | 4/1998 | |
| EP | 0896023 A1 | 2/1999 | |
| EP | 1607400 A2 | 12/2005 | |
| EP | 1624015 A1 | 2/2006 | |
| EP | 1705220 A1 | 9/2006 | |
| JP | H02-175604 A | 7/1990 | |
| JP | H04-89306 A | 3/1992 | |
| JP | H08-198609 A | 8/1996 | |
| JP | 2004-331975 A | 11/2004 | |
| JP | 2008-512525 A | 4/2008 | |
| JP | 2011-225723 A | 11/2011 | |
| WO | 97/39053 A1 | 10/1997 | |
| WO | 98/39381 A1 | 9/1998 | |
| WO | 03/078523 A1 | 9/2003 | |
| WO | 2004/048453 A1 | 6/2004 | |
| WO | 2007/007663 A1 | 1/2007 | |
| WO | 2009/109318 A1 | 9/2009 | |
| WO | 2012/045414 A1 | 4/2012 | |
| WO | WO 2012/045414 | * 4/2012 | |
| WO | WO 2014/045414 | * 4/2012 | |
| WO | 2013/083247 A1 | 6/2013 | |
| WO | 2013/083248 A1 | 6/2013 | |
| WO | WO 2013/083247 | * 6/2013 | |
| WO | WO 2013/083248 | * 6/2013 | |

OTHER PUBLICATIONS

International Search Report issued in related International Patent Application No. PCT/EP2012/004907 dated Feb. 4, 2013.
International Preliminary Report on Patentability issued in related International Patent Application No. PCT/EP2012/004907 dated Jun. 10, 2014.
International Search Report issued in related International Patent Application No. PCT/EP2012/004908 dated Feb. 4, 2013.
International Preliminary Report on Patentability issued in related International Patent Application No. PCT/EP2012/004908 dated Jun. 10, 2014.
International Search Report issued in related International Patent Application No. PCT/EP2012/004909 dated Feb. 4, 2013.
International Preliminary Report on Patentability issued in related International Patent Application No. PCT/EP2012/004909 dated Jun. 10, 2014.
International Search Report issued in related International Patent Application No. PCT/EP2012/004905 dated May 2, 2013.
International Preliminary Report on Patentability issued in related International Patent Application No. PCT/EP2012/004905 dated Jun. 10, 2014.

* cited by examiner

HALOGEN-FREE SOLID FLAME RETARDANT MIXTURE AND USE THEREOF

A wide variety of different kinds of flame retardant mixture are used to render polymers flame-retardant. It is a requirement in this context that, in the typical processes for polymer production, the components to be added, including the flame retardants, have good flowability and free flow, in order to be able to be distributed homogeneously in the polymer, in order that their properties are not adversely affected.

Flowability is affected by particle properties such as particle size, particle size distribution, surface properties of the particles, water content and moisture content, for example, and different particle forms. According to the particle size or frequency of particles of different size, they roll over one another more or less easily. Round particles having a homogeneous surface should flow more easily than those of irregular shape. The flow properties differ according to the chemical surface, moisture content or electrostatic properties.

If powders having poor flow properties are processed, there is often irregular dosage and hence an inhomogeneous composition and distribution in the polymer, resulting in inadequate flame retardancy from one molding to another.

According to the prior art, flowability can be increased by additions of separating agents and foreign bodies. Klein describes, as a solution to this problem, in Seifen-Öle-Fette-Wachse 94 (1968), 849, the addition of calcium stearate and Aerosil in amounts of 5000 to 10 000 ppm. The silicate-containing auxiliaries suggested here for improvement of free flow are extremely fine. They can be inhaled and are suspected of causing lung diseases.

WO 2003/035736A1 describes melamine cyanurate aggregates held together by binders. The problem addressed therein is that of improving the homogeneity of distribution of the aggregates by improving the free flow. This term is also referred to as flowability of bulk materials (powders, agglomerates, granules, etc.). Here, with addition of 1000 ppm to 10% by weight of organic auxiliary, the corresponding particles of specific size are bonded to form larger aggregates and hence the free flow is increased. These organic auxiliaries are typically organic compounds, for example polymers or copolymers based on vinylpyrrolidone, vinyl acetate and vinylcaprolactam, epoxides, urethanes, acrylates, esters, amides, stearates, olefins, cellulose derivatives or mixtures thereof. One way of producing the aforementioned aggregates is by dispersing the particles in an aqueous slurry beforehand and adding a water-soluble auxiliary.

EP-1522551A1 describes phosphorus-containing flame retardant agglomerates of low bulk density, which comprise aggregates and/or primary particles of phosphinic salts and/or diphosphinic salts and/or polymers thereof and stick together with the aid of an auxiliary. These agglomerates are obtainable by spray granulation.

In order to distribute the flame retardant agglomerates as homogeneously as possible in a polymer, one aim is to achieve particularly good flow characteristics of the bulk material. This is achieved through the use of the aforementioned flame retardant agglomerate having a low bulk density and nevertheless a low tendency to form dust. A low tendency to form dust is important since a tendency to form dust can cause inhomogeneous metering on incorporation into polymers in extruders, resulting in an inhomogeneous distribution of the flame retardant in the polymer. This can again be disadvantageous for the flame retardancy because of local underdosage that follows therefrom.

EP-1522551A1 is concerned only with increasing free flow or flowability, and not with improving the homogeneity of flow.

JP-2003138264A1 and JP-2003138265A1 describe good flowability for halogenated flame retardants through use of particularly large particles (0.8 to 2 mm).

In JP-2005171206A1, flame retardant mixtures having good free flow are obtained by combination of finely divided basic metal oxide particles with fine, fine fibrous or fine amorphous inorganic particles in platelet form and inorganic flame retardants.

WO-2010075087A1 describes a free-flowing flame retardant composition composed of a liquid phosphorus-containing flame retardant in which the latter is absorbed on a carrier.

One way of producing flame-retardant polymer molding compositions is, for example, by incorporating the flame retardant components into a polymer melt via the side intake of a twin-screw extruder at temperatures of 250 to 310° C. Glass fibers if necessary are added via a second side intake. The resultant homogenized polymer strand is drawn off, cooled in a water bath and then pelletized.

In the event of nonuniform flow of the flame retardant components, there may be temporary overfilling of filling funnels or underdosage in the event of insufficient product replenishment from the reservoir bunkers. Both are undesirable production faults. As a result, chemicals can escape into the working environment. There may also be varying product compositions in the flame-retardant polymer molding compositions. In the event of underdosage, this means inadequate flame retardancy for the polymer molding composition.

It is therefore an object of the present invention to provide a flame retardant mixture having uniform flow.

It is a further object of the present invention to avoid process faults in the production of flame-retardant polymer molding compositions.

The flame retardant mixtures of the invention do not contain any binders that cause the powder particles to stick together to form higher aggregates. The binders would only reduce the effectiveness of the flame retardants by reducing the amount of active substance (i.e. the flame retardant) by means of auxiliaries which may be combustible.

It is a further object of the invention to dispense with the use of water-soluble organic auxiliaries to improve the free flow; there should likewise be no increase in the particle size of the flame retardant particles.

It has been found that, surprisingly, the halogen-three flame retardant mixtures of the invention have uniform flow and at the same time achieve good flame retardancy.

The invention therefore relates to a halogen-free flame retardant mixture comprising 1% to 99% by weight of a component A and 1% to 99% by weight of a component B, wherein component A comprises 85% to 99.995% by weight of a solid diethylphosphinic salt of the metals Mg, Ca, Al, Sb, Sn, Ge, Ti, Fe, Zr, Zn, Ce, Bi, Sr, Mn, Li, Na, K and/or of a protonated nitrogen base and 0.005% to 15% by weight of noncombustible additions, and component B is aluminum phosphite.

More preferably, the halogen-free flame retardant mixture comprises 20% to 80% by weight of component A and 20% to 80% by weight of component B.

Preferably, component A of the halogen-free flame retardant mixture comprises 92% to 99.9% by weight of solid aluminum diethylphosphinate and 0.5% to 8% by weight of noncombustible additions.

The additions are preferably dialkylphosphinic salts of the formula (IV)

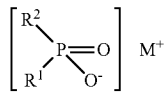

in which $R^1$ and $R^2$ are the same or different and are each independently ethyl, butyl, hexyl and/or octyl and M is Mg, Ca, Al, Sb, Sn, Ge, Ti, Fe, Zr, Zn, Ce, Bi, Sr, Mn, Li, Na, K and/or a protonated nitrogen base, with the proviso that $R^1$ and $R^2$ are not both ethyl; and/or the additions are sulfates, phosphates, phosphonates, nitrates, chlorides, sulfites and/or acetates, and the sulfates, phosphates, phosphonates, nitrates, chlorides, sulfites and/or acetates are compounds with cations of the alkali metals, of the alkaline earth metals, of the third main group, of the transition groups of the Periodic Table and/or of protonated nitrogen bases.

Preferably, the dialkylphosphinic salts of the formula (IV) are ethyl(butyl)-phosphinic salts, butyl(butyl)phosphinic salts, ethyl(hexyl)phosphinic salts, butyl(hexyl)phosphinic salts and/or hexyl(hexyl)phosphinic salts.

Preferably, the cations are those of the metals Mg, Ca, Al, Sb, Sn, Ge, Ti, Fe, Zr, Zn, Ce, Bi, Sr, Mn, Li, Na and/or K.

Preferably, the protonated nitrogen bases are ammonia or primary, secondary, tertiary and/or quaternary amines.

Preferably, the sulfates are sodium sulfates, sodium aluminum sulfates, alunites, aluminum sulfates, calcium sulfate, cerium sulfates, iron sulfates, potassium hydrogensulfates, potassium sulfate, magnesium sulfates, manganese sulfates, monolithium sulfate, titanium sulfates, zinc sulfate, tin sulfates, zirconium sulfates and/or hydrates thereof.

Preferably, the phosphates are aluminum phosphates, aluminum hydrogenphosphates, aluminum chloride phosphate, calcium hydrogenphosphates, calcium magnesium phosphates, calcium chloride phosphates, calcium aluminum phosphate, calcium carbonate phosphate, calcium phosphates, cerium phosphates, cerium hydrogenphosphate, lithium phosphate, lithium hydrogenphosphate, magnesium phosphates, magnesium hydrogenphosphates, potassium phosphates, potassium aluminum phosphate, potassium hydrogenphosphates, sodium hydrogenphosphates, sodium hydrate phosphates, sodium aluminum phosphates and/or hydrates thereof.

Preferably, the phosphonates are mono($C_{1-18}$-alkyl)phosphonates, mono($C_6$-$C_{10}$-aryl)phosphonates and/or mono($C_{1-18}$-aralkyl)phosphonates.

Preferably, the nitrates are aluminum nitrate, calcium nitrate, cerium nitrates, iron nitrates, potassium nitrate, lithium nitrate, magnesium nitrate, manganese nitrates, sodium nitrate, titanium nitrates, zinc nitrate, tin nitrates and/or zirconium nitrates and/or hydrates thereof.

Preferably, the acetates are aluminum acetate, calcium acetate, cerium acetate, iron acetate, lithium acetate, potassium acetate, sodium acetate, magnesium acetate, manganese acetate, titanium acetate, zinc acetate, tin acetate, zirconium acetate, aluminum chloride acetate, aluminum hydrogenchloride acetate and/or hydrates thereof.

Preferably, the sulfites are potassium sulfites, potassium hydrogensulfites, potassium metabisulfite, sodium sulfites, sodium metabisulfite, sodium hydrogensulfites, ammonium sulfites and/or hydrates thereof.

Preferably, the chlorides are aluminum chloride, calcium acetate chloride, calcium chloride, iron chloride, iron magnesium chloride, iron manganese chloride, iron zinc chloride, lithium chloride, magnesium chloride, titanium chloride, titanium oxide chloride, zinc chloride, zinc aluminum chloride, zinc oxide chloride, tin chloride, zirconyl chloride, aluminum chloride hydroxide, calcium hydroxide chloride, iron hydroxide chloride, lithium hydroxide chloride, magnesium hydroxide chloride, magnesium chloride hydroxide, zinc chloride hydroxide, tin hydroxide chloride, manganese chloride, potassium chloride, potassium aluminum chloride and/or hydrates thereof.

Preferably, the aluminum phosphites are those of the formulae (I), (II) and/or (III)

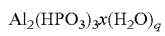

in which
q is 0 to 4,

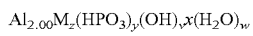

in which
M is alkali metal ions,
z is 0.01 to 1.5,
y is 2.63 to 3.5,
v is 0 to 2 and
w is 0 to 4,

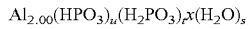

in which
u is 2 to 2.99,
t is 2 to 0.01 and
s is 0 to 4,
and/or are mixtures of aluminum phosphite of the formula (I) with sparingly soluble aluminum salts and nitrogen-free foreign ions, mixtures of aluminum phosphite of the formula (III) with aluminum salts, aluminum phosphite [Al($H_2PO_3$)$_3$], secondary aluminum phosphite [Al$_2$(HPO$_3$)$_3$], basic aluminum phosphite [Al(OH)(H$_2$PO$_3$)$_2$*2aq], aluminum phosphite tetrahydrate [Al$_2$(HPO$_3$)$_3$*4aq], aluminum phosphonate, Al$_7$(HPO$_3$)$_9$(OH)$_6$(1,6-hexanediamine)$_{1.5}$*12H$_2$O, Al$_2$(HPO$_3$)$_3$*xAl$_2$O$_3$*nH$_2$O with x=2.27-1, Al$_4$H$_6$P$_{16}$O$_{18}$ and/or mixtures of 0%-99.9% by weight of Al$_2$(HPO$_3$)$_3$*nH$_2$O with 0.1%-100% by weight of sodium aluminum phosphite.

Preferably, the aluminum phosphite is a mixture of 50%-99% by weight of Al$_2$(HPO$_3$)$_3$x(H$_2$O)$_q$ in which q is 0 to 4 and 1%-50% by weight of sodium aluminum phosphite.

Preferably, the aluminum phosphite is also a mixture of 50%-99% by weight of Al$_2$(HPO$_3$)$_3$x(H$_2$O)$_q$ in which q is 0 to 4 and 1%-50% by weight of Al$_{2.00}$M$_z$(HPO$_3$)$_y$(OH)$_v$x(H$_2$O)$_w$ (II) in which M is sodium, z is 0.005 to 0.15, y is 2.8 to 3.1, v is 0 to 0.4 and w 0 to 4.

Preferably, in the halogen-free flame retardant mixture, component A has a median particle size d50 of 0.05 to 10 μm and component B a median particle size d50 of 0.05 to 10 μm and a residual moisture content of 0.05% to 8% by weight.

The invention also relates to a process for producing a halogen-free flame retardant mixture, which comprises mixing components A and B in powder form with one another and optionally sieving.

The invention further relates to a process for producing the halogen-free flame retardant mixture, wherein a diethylphosphinic salt of the metals Mg, Ca, Al, Sb, Sn, Ge, Ti, Fe, Zr, Zn, Ce, Bi, Sr, Mn, Li, Na, K and/or of a protonated nitrogen base is mixed together with noncombustible additions and component B in powder form.

The invention likewise relates to the use of a halogen-free flame retardant mixture an intermediate for further syntheses, as a binder, as a crosslinker or accelerator in the curing of epoxy resins, polyurethanes and unsaturated polyester resins, as polymer stabilizers, as crop protection agents, as a sequestrant, as a mineral oil additive, as an anticorrosive, in washing and cleaning composition applications and in electronics applications.

Preference is given to the use of a halogen-free flame retardant mixture in or as flame retardants, as flame retardants for clearcoats and intumescent coatings, in or as flame retardants for wood and other cellulosic products, in or as reactive and/or nonreactive flame retardants for polymers, for production of flame-retardant polymer molding compositions, for production of flame-retardant polymer moldings, and/or for rendering pure and blended polyester and cellulose fabrics flame-retardant by impregnation and/or as a synergist and/or as a synergist in further flame retardant mixtures.

The invention also relates to flame-retardant thermoplastic or thermoset polymer molding compositions, polymer moldings, films, filaments and/or fibers comprising 0.1% to 45% by weight of halogen-free flame retardant mixture, 55% to 99.9% by weight of thermoplastic or thermoset polymer or mixtures thereof, 0% to 55% by weight of additives and 0% to 55% by weight of filler or reinforcing materials, where the sum total of the components is 100% by weight.

Preference is given to flame-retardant thermoplastic or thermoset polymer molding compositions, polymer moldings, films, filaments and/or fibers comprising 1% to 30% by weight of halogen-free flame retardant mixture, 10% to 97% by weight of thermoplastic or thermoset polymer or mixtures thereof, 1% to 30% by weight of additives and 1% to 30% by weight of filler or reinforcing materials, where the sum total of the components is 100% by weight.

The invention further relates to flame-retardant thermoplastic or thermoset polymer molding compositions, polymer moldings, films, filaments and/or fibers comprising a halogen-free flame retardant mixture, wherein the polymer comprises thermoplastic polymers of the HI (high-impact) polystyrene, polyphenylene ether, polyamide, polyester or polycarbonate type, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer type, and/or thermoset polymers of the unsaturated polyester or epoxy resin type.

More preferably, the polymer is nylon-4,6 (poly(tetramethyleneadipamide)), nylon-6 (polycaprolactam, poly-6-aminohexanoic acid), nylon-6,6 ((poly(N,N'-hexamethyleneadipamide) and/or HTN (high-temperature nylon).

More preferably, component A comprises 99.1% to 99.95% by weight of solid aluminum diethylphosphinate and 0.05% to 0.9% by weight of noncombustible additions.

The term diethylphosphinic salt hereinafter always means a diethylphosphinic salt of the metals Mg, Ca, Al, Sb, Sn, Ge, Ti, Fe, Zr, Zn, Ce, Bi, Sr, Mn, Li, Na, K and/or of a protonated nitrogen base.

In one embodiment of the invention, the particularly preferred additions are dialkylphosphinic acid telomers, for example ethyl(butyl)phosphinic acid salts, butyl(butyl)phosphinic acid salts, ethyl(hexyl)phosphinic acid salts, butyl(hexyl)phosphinic acid salts, hexyl(hexyl)phosphinic acid salts inter alia of the metals Mg, Ca, Al, Sb, Sn, Ge, Ti, Fe, Zr, Zn, Ce, Bi, Sr, Mn, Li, Na, K and/or of a protonated nitrogen base.

Preference is given here to a halogen-free flame retardant mixture comprising 1% to 99% by weight of a component A and 1% to 99% by weight of a component B, where component A comprises 85% to 99.995% by weight of a diethylphosphinic salt of the aforementioned metals and 0.005% to 15% by weight of noncombustible additions and component B is aluminum phosphite.

Preference is also given to a halogen-free flame retardant mixture comprising 10% to 90% by weight of a component A and 10% to 90% by weight of a component B, where component A comprises 85% to 99.995% by weight of a diethylphosphinic salt of the aforementioned metals and 0.005% to 15% by weight of noncombustible additions and component B is aluminum phosphite.

Preference is likewise given to a halogen-free flame retardant mixture comprising 20% to 80% by weight of a component A and 20% to 80% by weight of a component B, where component A comprises 85% to 99.995% by weight of a diethylphosphinic salt of the aforementioned metals and 0.005% to 15% by weight of noncombustible additions and component B is aluminum phosphite.

Particular preference is given to a halogen-free flame retardant mixture comprising 1% to 99% by weight of a component A and 1% to 99% by weight of a component B, where component A comprises 92% to 99.9% by weight of a diethylphosphinic salt of the aforementioned metals and 0.1% to 8% by weight of noncombustible additions and component B is aluminum phosphite.

Particularly preferred noncombustible additions are dialkylphosphinic acid telomers in salt form, for example ethyl(butyl)phosphinic acid salts, butyl(butyl)phosphinic acid salts, ethyl(hexyl)phosphinic acid salts, butyl(hexyl) phosphinic acid salts, hexyl(hexyl)phosphinic acid salts of the metals Mg, Ca, Al, Sb, Sn, Ge, Ti, Fe, Zr, Zn, Ce, Bi, Sr, Mn, Li, Na, K and/or of a protonated nitrogen base.

Preferred inventive halogen-free flame retardant mixtures comprising dialkylphosphinic acid telomers as noncombustible addition are:

I) Halogen-free flame retardant mixture comprising 1% to 99% by weight of a component A and 1% to 99% by weight of aluminum phosphite, where component A comprises 85% to 99.995% by weight of diethylphosphinic salt and 0.005% to 15% by weight of dialkylphosphinic acid telomers.

II) Halogen-free flame retardant mixture comprising 10% to 90% by weight of a component A and 10% to 90% by weight of aluminum phosphite, where component A comprises 85% to 99.995% by weight of diethylphosphinic salt and 0.005% to 15% by weight of dialkylphosphinic acid telomers.

III) Halogen-free flame retardant mixture comprising 20% to 80% by weight of a component A and 20% to 80% by weight of aluminum phosphite, where component A comprises 85% to 99.995% by weight of diethylphosphinic salt and 0.005% to 15% by weight of dialkylphosphinic acid telomers.

IV) Halogen-free flame retardant mixture comprising 1% to 99% by weight of a component A and 1% to 99% by weight of aluminum phosphite, where component A comprises 92% to 99.9% by weight of diethylphosphinic salt and 0.1% to 8% by weight of dialkylphosphinic acid telomers.

The noncombustible additions may preferably also be sulfates.

Preferred sulfates in that case are those with cations of the alkali metals and with cations of protonated nitrogen bases, for example of ammonia or primary, secondary, tertiary and quaternary amines, and with cations of the alkaline earth metals; with cations of the elements of the third main group; with cations of the transition group elements. Particularly preferred transition group elements here are titanium, iron, zinc and mixtures thereof.

Preferred sulfates are those with cations of the metals Mg, Ca, Al, Sb, Sn, Ge, Ti, Fe, Zr, Zn, Ce, Bi, Sr, Mn, Li, Na, K and/or a protonated nitrogen base.

Particularly preferred sulfates are sodium sulfate, sodium aluminum sulfate and alunite.

Further-preferred sulfates are:

aluminum sulfate, calcium sulfate, cerium(II) sulfate, cerium(IV) sulfate, cerium sulfate, iron(II) sulfate, iron(III) sulfate, iron sulfate, potassium sulfate, potassium hydrogensulfate, magnesium sulfate, magnesium sulfate, manganese (III) sulfate, manganese(III) sulfate, manganese(IV) sulfate, manganese sulfate, monolithium sulfate, sodium sulfate, sodium sulfate, titanium(II) sulfate, titanium(III) sulfate, titanium(IV) sulfate, titanium sulfate, zinc sulfate, tin(II) sulfate, tin(III) sulfate, tin(IV) sulfate, tin sulfate, zirconium (II) sulfate, zirconium(IV) sulfate, zirconium sulfate.

Preferred alunites are:

aluminite ($Al_2(OH)_4(SO_4).7H_2O$), metabasaluminite ($Al_4(OH)_{10}(SO_4)$), metaaluminite ($Al_2(OH)_4(SO_4).5H_2O$), rostite ($Al(OH)(SO_4).5H_2O$), zaherite ($Al_{12}O_{13}(SO_4)_5.xH_2O$), aluminum hydroxide oxide sulfate ($Al_{30}(OH)_{56}O_8(SO_4)_9$), aluminum hydroxide oxide sulfate hydrate, aluminum hydroxide sulfate ($Al(OH)_{2.24}(SO_4)_{0.38}$), aluminum hydroxide oxide sulfate hydrate, aluminum hydroxide sulfate ($Al_3(OH)_5(SO_4)_2$), aluminum hydroxide oxide sulfate nonahydrate, aluminum hydroxide sulfate ($Al_4(OH)_{10}(SO_4)$), aluminum hydroxide oxide sulfate hydrate, rostite ($Al(OH)(SO_4).5H_2O$), aluminum hydroxide sulfate ($Al_7(OH)_{17}(SO_4)_2$), aluminum hydroxide sulfate dodecahydrate, paraluminite ($Al_4(OH)_{10}(SO_4).10H_2O$), metaaluminite ($Al_2(OH)_4(SO_4).5H_2O$), felsobanyite ($Al_4(OH)_{10}(SO_4).5H_2O$), aluminite ($Al_2(OH)_4(SO_4).7H_2O$), aluminum hydroxide sulfate ($Al_3(OH)_7(SO_4)$), aluminum hydroxide sulfatehydrate, aluminum hydroxide sulfate ($Al_3(OH)_5(SO_4)_2$), aluminum hydroxide sulfatedihydrat, aluminum hydroxide sulfate ($Al(OH)_{2.7}(SO_4)_{0.15}$), aluminum hydroxide sulfate hydrate, aluminum hydroxide sulfate ($Al_7(OH)_{17}(SO_4)_2$), aluminum hydroxide sulfate hydrate, aluminum hydroxide sulfate ($Al(OH)(SO_4)$), aluminum hydroxide sulfate hydrate, aluminum hydroxide sulfate ($Al_4(OH)_{10}(SO_4)$), aluminum hydroxide sulfate decahydrate, jurbanite ($Al(OH)(SO_4).5H_2O$), aluminum hydroxide sulfate ($Al_4(OH)_{10}(SO_4)$), aluminum hydroxide sulfate pentahydrate, aluminum hydroxide sulfate ($Al_6(OH)_{16}(SO_4)$), aluminum hydroxide sulfate hydrate, basaluminite ($Al_4(OH)_{10}(SO_4).5H_2O$), aluminum hydroxide sulfate ($Al(OH)(SO_4)$), aluminum hydroxide sulfate pentahydrate, minamiite ($(Na, Ca)_{1-x}Al_3(SO_4)_2(OH)_6$), aluminum sulfate hydrate oxide $Al_6O_5(SO_4)_4*xH_2O$, zaherite-16A $Al_{12}(SO_4)_5(OH)_{26}$, aluminum sulfate hydroxide $Al_4SO_4(OH)_{10}$, zaherite-18A $Al_{12}(SO_4)_5(OH)_{26}*20H_2O$, hydrobasaluminite $Al_4SO_4(OH)_{10}*36H_2O$, aluminum sulfate hydroxide hydrate $Al_3(SO_4)_2(OH)_5*9H_2O$, basaluminite/felsobanyaite $Al_4SO_4(OH)_{10}*4H_2O$, aluminite $Al_2(SO_4)(OH)_4*7H_2O$, syn-winebergite $Al_4SO_4(OH)_{10}*7H_2O$, felsobanyaite $Al_4SO_4(OH)_{10}*5H_2O$, syn-metaaluminite $Al_4SO_4(OH)_4*5H_2O$, rostite $Al_4SO_4(OH)*5H_2O$, aluminum sulfate hydroxide hydrate 3 $Al_2O_3*4SO_3*H_2O$, natroalunite $NaAl_3(SO_4)_2(OH)_6$.

Preferred inventive halogen-free flame retardant compositions comprising sulfate as noncombustible addition are:

I) Halogen-free flame retardant mixture comprising 1% to 99% by weight of a component A and 1% to 99% by weight of aluminum phosphite, where component A comprises 95% to 99.995% by weight of diethylphosphinic salt and 0.005% to 5% by weight of sulfate.

II) Halogen-free flame retardant mixture comprising 10% to 90% by weight of a component A and 10% to 90% by weight of aluminum phosphite, where component A comprises 95% to 99.995% by weight of diethylphosphinic salt and 0.005% to 5% by weight of sulfate.

III) Halogen-free flame retardant mixture comprising 20% to 80% by weight of a component A and 20% to 80% by weight of aluminum phosphite, where component A comprises 95% to 99.995% by weight of diethylphosphinic salt and 0.005% to 5% by weight of sulfate.

IV) Halogen-free flame retardant mixture comprising 1% to 99% by weight of a component A and 1% to 99% by weight of aluminum phosphite, where component A comprises 99.1% to 99.99% by weight of diethylphosphinic salt and 0.01% to 0.9% by weight of sulfate.

The noncombustible additions may preferably also be phosphates.

Preferred phosphates are those with cations of the alkali metals and with cations of protonated nitrogen bases, for example of ammonia or primary, secondary, tertiary and quaternary amines, and with cations of the alkaline earth metals; with cations of the elements of the third main group; with cations of the transition group elements. Particularly preferred transition group elements here are titanium, iron, zinc and mixtures thereof.

Preferred phosphates are those with cations of the metals Mg, Ca, Al, Sb, Sn, Ge, Ti, Fe, Zr, Zn, Ce, Bi, Sr, Mn, Li, Na, K and/or a protonated nitrogen base.

Preferred phosphates are aluminum phosphate $AlPO_4$, $Al_2O_3*P_2O_5$, $Al_{36}P_{36}O_{144}$, $Al_{16}P_{16}O_{64}$, $Al_8P_8O_{22}$, $Al_2O_3*xP_2O_5$, $Al_2O_3*0.95P_2O_5$, $Al_2O_3*0.86P_2O_5$, $Al_{12}P_{12}O_{48}$, $Al_2P_6O_{18}$, aluminum phosphate hydrate $Al_2P_{1.94}O_{7.85}*2H_2O$, $AlPO_4*xH_2O$, $AlPO_4*0.45H_2O$, $Al_{32}P_{32}O_{128}*xH_2O$, $Al_6P_6O_{24}*4H_2O$, $AlPO_4*1.67H_2O$, $Al_4(P_2O_7)_3*12H_2O$, $Al_2P_2O_8*3H_2O$, $AlP_6O_{18}*9.5H_2O$, $Al_6P_6O_{21}*8H_2O$, aluminum hydrogenphosphate $Al(H_2PO_4)_3$, $H_2(AlPOPO_4)_3$, aluminum hydrogenphosphate hydrate $AlH_6(PO_4)_3*2H_2O$, $AlH_3(PO_4)_2*nH_2O$, $Al(HP_2O_7)*2.5H_2O$, $AlH_3(PO_4)_2*3H_2O$, aluminum chloride phosphate $Al(PO_2Cl_2)_3$, calcium hydrogenphosphate $Ca_3H_2P_4O_{14}$, $Ca(H_2PO_4)_2$, $CaH_2PO_7$, $Ca_4H_2(P_3O_{10})_2$, $CaPO_3(OH)$, calcium magnesium phosphate $Ca_3Mg_3(PO_4)_2$, $Ca_7Mg_2P_6O_{24}$, $CaMgP_2O_7$, $(Ca,Mg)_3(PO_4)_2$, calcium chloride phosphate $Ca_2PO_4Cl$, calcium phosphate $Ca_3P_2O_7$, $CaP_4O_{11}$, $Ca_2P_6O_{17}$, $Ca_3(P_5O_{14})_2$, $CaP_2O_6$, $CaP_2O_7$, $Ca_4P_6O_{19}$, $Ca_4(PO_4)_2$, $Ca_{x+2}P_{2x}O_{6x+2}$, calcium aluminum phosphate $Ca_9Al(PO_4)_7$, calcium carbonate phosphate $Ca_{10}(PO_4)_6CO_3$, calcium phosphate hydrate $Ca_2P_2O_7*2H_2O$, beta-$Ca_2(P_4O_{12})*4H_2O$, $Ca_3(PO_3)_6*10H_2O$, $Ca_4P_8O_{24}*16H_2O$, $Ca_2P_2O_7*2H_2O$, $Ca_2(P_4O_{12})*4H_2O$, $Ca_2P_2O_7*4H_2O$, $Ca_3(PO_4)_2*xH_2O$, $CaAlH(PO_4)_2*6H_2O$, $Ca_8H_2(PO_4)_6*5H_2O$, $Ca_4H(PO_4)_3*5H_2O$, $Ca_3H_2(P_2O_7)_2*4H_2O$, $Ca_{1.5}HP_2O_7*2H_2O$, $Ca(H_2PO_4)_2*H_2O$, $Ca_3H_2(P_2O_7)_2*H_2O$, cerium phosphate $CePO_4$, $CeP_2O_7$, $Ca(PO_3)_4$, $CaP_5O_{14}$, $CeP_3O_9$, $Ce_4(P_2O_7)_3$, calcium phosphate alpha-, beta-, gamma-$Ca_2P_2O_7$, $CaP_4O_{11}$, $Ca_2P_6O_{17}$, alpha-$CaP_4O_{11}$, $Ca_3$ $(P_5O_{14})_2$, beta-, delta-, gamma-$Ca(PO_3)_2$, alpha-, beta-$Ca_2P_2O_6$, $Ca_4P_6O_{19}$, alpha-, beta-, gamma-$Ca_3(PO_4)_2$, $Ca_{x+2}P_{2x}O_{6x+2}$, cerium phosphate $CePO_4$, $CeP_2O_7$, $Ca(PO_3)_4$, $CeP_5O_{14}$, $CeP_3O_9$, $Ce_4(P_2O_7)_3$, $CeP_5O_{14}$, cerium hydrogenphosphate $CeH_2P_2O_8$, lithium phosphate hydrate $Li_4P_4O_{12}*4H_2O$, $Li_8P_8O_{24}*10H_2O$, $Li_6P_6O_{18}*6H_2O$, $Li_6P_8O_{24}*6H_2O$, $Li_4P_4O_{12}*nH_2O$, $Li_6P_6O_{18}*nH_2O$, $Li_3P_3O_9*3H_2O$, lithium hydrogenphosphate $Li_3HP_2O_7*H_2O$, magnesium phosphate hydrate $Mg_4P_8O_{24}*19H_2O$, $Mg_2P_4O_{12}*8H_2O$, $Mg_3(PO_4)_2*nH_2O$, $Mg_2P_2O_7*2H_2O$, magnesium hydrogenphosphate hydrate $MgHPO_4*nH_2O$, $Mg(H_2PO_4)_2*nH_2O$, potassium phosphate hydrate $KPs_8O_{24}*6H_2O$, $(KPO_3)_4*2H_2O$, $K_6P_6O_6O_{18}*3H_2O$, alpha-, beta-$K_5P_3O_{10}*nH_2O$, $K_{10}P_{10}O_{30}*4H_2O$, $K_4P_2O_7*nH_2O$, $K_5P_3O_{10}*nH_2O$, $K_3PO_4*nH_2O$, $K_{10}P_6O_{20}*H_2O$, potassium aluminum phosphate hydrate $K_6Al_2P_6O_{21}*12H_2O$, potassium hydrogenphosphate hydrate $K_2H_2P_2O_7*nH_2O$, $K_3H_2P_2O_7*0.5H_2O$, $KH_3P_2O_7*H_2O$, $K_3H_2P_3O_{10}*H_2O$, $K_4HP_3O_{10}*xH_2O$, $KH_3(PO_4)_2*_2H_2O$, $K_2H_3P_3O_{10}*2H_2O$, $K_3HP_2O_7*3H_2O$, $K_2HPO_4*3H_2O$, $K_3HP_2O_7*3H_2O$, sodium hydrogenphosphate hydrate $Na_3HP_2O_6*9H_2O$, $Na_3HP_2O_7*H_2O$, $Na_2H_2P_2O_7*6H_2O$, $Na_2H_2P_2O_6*6H_2O$, $NaH_2PO_4*12H_2O$, $NaH_2PO_4*H_2O$, $NaH_3P_2O_6*xH_2O$, beta-$Na_2HPO_4*12H_2O$, $Na_3H_2P_3O_{10}*1.4H_2O$, $2NaH_2PO_4*Na_2HPO_4*2H_2O$, $NaH_2PO_4*2H_2O$, $NaH_2PO_2*H_2O$, $Na_2HPO_4*nH_2O$, $Na_4HP_3O_{10}*H_2O$, $Na_2HPO_3*5H_2O$, $Na_3HP_2O_7*nH_2O$, $Na_3H_2P_3O_{10}*1.5H_2O$, sodium hydrate phosphate $Na_3P_3O_9*nH_2O$, $Na_5P_3O_{10}*6H_2O$, $(NaPO_3)_3*nH_2O$, $Na_6P_6O_{18}*6H_2O$, $Na_5(P_5O_{15})*4H_2O$, $Na_4P_2O_6*nH_2O$, $Na_4P_2O_7*10H_2O$, $Na_4P_4O_{12}*4H_2O$, $(NaPO_2)_6*nH_2O$, sodium aluminum phosphate hydrate $Na_2AlP_3O_{10}*4H_2O$, $Na_2AlP_2O_{10}*2H_2O$, $Na_2AlP_3O_{10}$, $Na_2(AlP_3O_{10})*2H_2O$, $Na_3Al(PO_4)_2*1.5H_2O$, $Na_2Al_6P_2O_{15}*10H_2O$.

Preferred inventive halogen-free flame retardant mixtures comprising phosphate as noncombustible addition are:

I) Halogen-free flame retardant mixture comprising 1% to 99% by weight of a component A and 1% to 99% by weight of aluminum phosphite, where component A comprises 95% to 99.995% by weight of diethylphosphinic salt and 0.005% to 5% by weight of phosphate.

II) Halogen-free flame retardant mixture comprising 10% to 90% by weight of a component A and 10% to 90% by weight of aluminum phosphite, where component A comprises 95% to 99.995% by weight of diethylphosphinic salt and 0.005% to 5% by weight of phosphate.

III) Halogen-free flame retardant mixture comprising 20% to 80% by weight of a component A and 20% to 80% by weight of aluminum phosphite, where component A comprises 95% to 99.995% by weight of diethylphosphinic salt and 0.005% to 5% by weight of phosphate.

IV) Halogen-free flame retardant mixture comprising 1% to 99% by weight of a component A and 1% to 99% by weight of aluminum phosphite, where component A comprises 99.3% to 99.95% by weight of diethylphosphinic salt and 0.05% to 0.7% by weight of phosphate.

The noncombustible additions may preferably also be organophosphonates.

Preferred organophosphates are those with cations of the alkali metals and with cations of protonated nitrogen bases, for example of ammonia or primary, secondary, tertiary and quaternary amines, and with cations of the alkaline earth metals; with cations of the elements of the third main group; with cations of the transition group elements. Particularly preferred transition group elements here are titanium, iron, zinc and mixtures thereof.

Preferred organophosphonates are those with cations of the metals Mg, Ca, Al, Sb, Sn, Ge, Ti, Fe, Zr, Zn, Ce, Bi, Sr, Mn, Li, Na, K and/or a protonated nitrogen base.

Preferred organophosphonates are, for instance, monoorganyl phosphonates such as mono($C_{1-18}$-alkyl) phosphonates, mono($C_6$-$C_{10}$-Aryl) phosphonates, mono($C_{7-18}$-aralkyl) phosphonates, and among these particularly monomethyl phosphonates, monoethyl phosphonates, monobutyl phosphonates, monohexyl phosphonates, monophenyl phosphonates, monobenzyl phosphonates, etc.

Preferred inventive halogen-free flame retardant mixtures comprising organophosphonate as noncombustible addition are:

I) Halogen-free flame retardant mixture comprising 1% to 99% by weight of a component A and 1% to 99% by weight of aluminum phosphite, where component A comprises 95% to 99.995% by weight of diethylphosphinic salt and 0.005% to 5% by weight of organophosphonate.

II) Halogen-free flame retardant mixture comprising 10% to 90% by weight of a component A and 10% to 90% by weight of aluminum phosphite, where component A comprises 95% to 99.995% by weight of diethylphosphinic salt and 0.005% to 5% by weight of organophosphonate.

III) Halogen-free flame retardant mixture comprising 20% to 80% by weight of a component A and 20% to 80% by weight of aluminum phosphite, where component A comprises 95% to 99.995% by weight of diethylphosphinic salt and 0.005% to 5% by weight of organophosphonate.

IV) Halogen-free flame retardant mixture comprising 1% to 99% by weight of a component A and 1% to 99% by weight of aluminum phosphite, where component A comprises 98% to 99.95% by weight of diethylphosphinic salt and 0.05% to 2% by weight of organophosphonate.

The noncombustible additions may preferably also be nitrates.

Preferably, the nitrates are those with cations of the alkali metals and with cations of protonated nitrogen bases, for example of ammonia or primary, secondary, tertiary and quaternary amines, and with cations of the alkaline earth metals; with cations of the elements of the third main group and with cations of the transition group elements. Particularly preferred transition group elements here are titanium, iron, zinc and mixtures thereof.

Preferred nitrates are those with cations of the metals Mg, Ca, Al, Sb, Sn, Ge, Ti, Fe, Zr, Zn, Ce, Bi, Sr, Mn, Li, Na, K and/or a protonated nitrogen base.

Preferred nitrates are aluminum nitrate ($Al(NO_3)_3$), calcium nitrate ($Ca(NO_3)_2$), cerium(II) nitrate ($Ce(NO_3)_2$), cerium(III) nitrate ($Ce(NO_3)_3$), cerium(IV) nitrate ($Ce(NO_3)_4$), cerium nitrate ($Ce(NO_3)_x$), iron nitrate ($Fe(NO_3)_x$), iron(II) nitrate ($Fe(NO_3)_2$), iron(III) nitrate ($Fe(NO_3)_3$), potassium nitrate ($KNO_3$), lithium nitrate ($LiNO_3$), magnesium nitrate ($Mg_{1/2}NO_3$), manganese(II) nitrate ($Mn_{1/2}NO_3$), manganese(III) nitrate ($Mn_{1/3}NO_3$), manganese(IV) nitrate ($Mn_{1/4}NO_3$), sodium nitrate ($NaNO_3$), titanium nitrate ($Ti(NO_3)_x$), titanium(II) nitrate ($Ti_{1/2}NO_3$), titanium(III) nitrate ($Ti_{1/3}NO_3$), titanium(IV) nitrate ($Ti_{1/4}NO_3$), zinc nitrate ($Zn_{1/2}NO_3$), tin nitrate ($Sn(NO_3)_x$), tin(II) nitrate ($Sn_{1/2}NO_3$), tin(IV) nitrate ($Sn_{1/4}NO_3$), zirconium nitrate ($Zr(NO_3)_x$), zirconium(II) nitrate ($Zr_{1/2}NO_3$) and/or zirconium(IV) nitrate ($Zr_{1/4}NO_3$).

Preferred inventive halogen-free flame retardant mixtures comprising nitrate as noncombustible addition are:

I) Halogen-free flame retardant mixture comprising 1% to 99% by weight of a component A and 1% to 99% by weight of aluminum phosphite, where component A comprises 95% to 99.995% by weight of diethylphosphinic salt and 0.005% to 5% by weight of nitrate.

II) Halogen-free flame retardant mixture comprising 10% to 90% by weight of a component A and 10% to 90% by weight of aluminum phosphite, where component A comprises 95% to 99.995% by weight of diethylphosphinic salt and 0.005% to 5% by weight of nitrate.

III) Halogen-free flame retardant mixture comprising 20% to 80% by weight of a component A and 20% to 80% by weight of aluminum phosphite, where component A comprises 95% to 99.995% by weight of diethylphosphinic salt and 0.005% to 5% by weight of nitrate.

IV) Halogen-free flame retardant mixture comprising 1% to 99% by weight of a component A and 1% to 99% by weight of aluminum phosphite, where component A comprises 99.79% to 99.99% by weight of diethylphosphinic salt and 0.01% to 0.21% by weight of nitrate.

The noncombustible additions may preferably also be chlorides.

Preferred chlorides are those with cations of the alkali metals and with cations of protonated nitrogen bases, for example of ammonia or primary, secondary, tertiary and quaternary amines, and with cations of the alkaline earth metals; with cations of the elements of the third main group; with cations of the transition group elements. Particularly preferred transition group elements here are titanium, iron, zinc and mixtures thereof.

Preferred chlorides are those with cations of the metals Mg, Ca, Al, Sb, Sn, Ge, Ti, Fe, Zr, Zn, Ce, Bi, Sr, Mn, Li, Na, K and/or a protonated nitrogen base The preferred chlorides include:

aluminum chloride acetate ($C_4H_6AlClO_4$), aluminum hydrogenchloride acetate, aluminum chloride $AlCl_3$, aluminum chloride hydrate $AlCl_3*nH_2O$, calcium acetate chloride hydrate $C_2H_3CaClO_2*nH_2O$, calcium chloride $CaC_2$, calcium chloride hydrate $CaCl_2*nH_2O$, iron chloride hydrate $2FeCl_2*nH_2O$, $FeCl_3*nH_2O$, iron magnesium chloride hydrate $FeMgC_4*nH_2O$, iron manganese chloride hydrate $Mn_{0.5}Fe_{0.5}Cl_2*nH_2O$, iron zinc chloride hydrate $FeZnC_4*nH_2O$, lithium chloride $LiCl*nH_2O$, magnesium chloride hydrate $MgCl_2*nH_2O$, titanium chloride hydrate $TiCl_3*nH_2O$, titanium oxide chloride hydrate $Ti_{29}O_{42}Cl_{32}*10H_2O$, $Ti_2O_2Cl_4*2H_2O$, zinc chloride $ZnCl_2*nH_2O$, zinc aluminum chloride hydrate $Zn_2Al(OH)_6Cl*1.8H_2O$, zinc oxide chloride hydrate $Zn_2OCl_2*2H_2O$, tin chloride hydrate $SnCl_4*nH_2O$, $SnCl_2*nH_2O$, zirconyl chloride hydrate $ZrOCl_2*nH_2O$, aluminum chloride hydroxide $Al_{29}(OH)_{78}Cl_9$, $Al_{11}(OH)_{30}Cl_3$, aluminum chloride hydroxide hydrate $Al_{13}Cl_{15}(OH)_{24}*37.5H_2O$, calcium hydroxide chloride, iron hydroxide chloride $Fe_6Cl_{2-x}(OH)_{12+x}$, lithium hydroxide chloride $Li_2Cl(OH)$, magnesium hydroxide chloride MgClOH, magnesium chloride hydroxide hydrate $Mg_2(OH)_3Cl*4H_2O$, zinc chloride hydroxide hydrate, tin hydroxide chloride $Sn_4(OH)_6Cl_2$, iron chloride $FeCl_2$, $FeCl_3$, lithium chloride, magnesium chloride, manganese chloride $MnCl_2$, potassium chloride and potassium aluminum chloride.

Preferred inventive halogen-free flame retardant mixtures comprising chloride as noncombustible addition are:

I) Halogen-free flame retardant mixture comprising 1% to 99% by weight of a component A and 1% to 99% by weight of aluminum phosphite, where component A comprises 95% to 99.995% by weight of diethylphosphinic salt and 0.005% to 5% by weight of chloride.

II) Halogen-free flame retardant mixture comprising 10% to 90% by weight of a component A and 10% to 90% by weight of aluminum phosphite, where component A comprises 95% to 99.995% by weight of diethylphosphinic salt and 0.005% to 5% by weight of chloride.

III) Halogen-free flame retardant mixture comprising 20% to 80% by weight of a component A and 20% to 80% by weight of aluminum phosphite, where component A comprises 95% to 99.995% by weight of diethylphosphinic salt and 0.005% to 5% by weight of chloride.

IV) Halogen-free flame retardant mixture comprising 1% to 99% by weight of a component A and 1% to 99% by weight of aluminum phosphite, where component A comprises 99.5% to 99.99% by weight of diethylphosphinic salt and 0.01% to 0.5% by weight of chloride.

The noncombustible additions may preferably also be acetates.

Preferred acetates are those with cations of the alkali metals and with cations of protonated nitrogen bases, for example of ammonia or primary, secondary, tertiary and quaternary amines, and with cations of the alkaline earth metals; with cations of the elements of the third main group; with cations of the transition group elements. Particularly preferred transition group elements here are titanium, iron, zinc and mixtures thereof.

Preferred acetates are those with cations of the metals Mg, Ca, Al, Sb, Sn, Ge, Ti, Fe, Zr, Zn, Ce, Bi, Sr, Mn, Li, Na, K and/or a protonated nitrogen base Acetates suitable in accordance with the invention are, for instance: aluminum acetate ($Al_{1/3}(C_2H_4O_2)$), calcium acetate ($Ca_{1/2}(C_2H_4O_2)$), cerium (II) acetate, cerium(III) acetate ($Ce_{1/3}(C_2H_4O_2)$), cerium (IV) acetate ($Ce_{1/4}(C_2H_4O_2)$), iron acetate ($Fe_x(C_2H_4O_2)$), iron(II) acetate) ($Fe_{1/2}(C_2H_4O_2)$), iron(III) acetate ($Fe_{1/3}(C_2H_4O_2)$), potassium acetate ($K(C_2H_4O_2)$), lithium acetate ($Li(C_2H_4O_2)$), magnesium acetate ($Mg_{1/2}(C_2H_4O_2)$), manganese acetate ($Mn_x(C_2H_4O_2)$), manganese(II) acetate ($Mn_{1/2}(C_2H_4O_2)$), manganese(III) acetate ($Mn_{1/3}(C_2H_4O_2)$), manganese(IV) acetate ($Mn_{1/4}(C_2H_4O_2)$), sodium acetate ($Na(C_2H_4O_2)$), titanium acetate, titanium(II) acetate, titanium(III) acetate, titanium(IV) acetate ($Ti_{1/4}(C_2H_4O_2)$), zinc acetate ($Zn_{1/2}(C_2H_4O_2)$), tin(II) acetate ($Sn_{1/2}(C_2H_4O_2)$), tin(IV) acetate ($Sn_{1/4}(C_2H_4O_2)$), tin acetate ($Sn_x(C_2H_4O_2)$), zirconium acetate ($Zr_x(C_2H_4O_2)$), zirconium(II) acetate ($Zr_{1/2}(C_2H_4O_2)$), zirconium(III) acetate and/or zirconium (IV) acetate ($Zr_{1/4}(C_2H_4O_2)$).

Preferred inventive halogen-free flame retardant mixtures comprising acetate as noncombustible addition are:

I) Halogen-free flame retardant mixture comprising 1% to 99% by weight of a component A and 1% to 99% by weight of aluminum phosphite, where component A comprises 95% to 99.995% by weight of diethylphosphinic salt and 0.005% to 5% by weight of acetate.

II) Halogen-free flame retardant mixture comprising 10% to 90% by weight of a component A and 10% to 90% by weight of aluminum phosphite, where component A comprises 95% to 99.995% by weight of diethylphosphinic salt and 0.005% to 5% by weight of acetate.

III) Halogen-free flame retardant mixture comprising 20% to 80% by weight of a component A and 20% to 80% by weight of aluminum phosphite, where component A comprises 95% to 99.995% by weight of diethylphosphinic salt and 0.005% to 5% by weight of acetate.

IV) Halogen-free flame retardant mixture comprising 1% to 99% by weight of a component A and 1% to 99% by weight of aluminum phosphite, where component A comprises 99.25% to 99.99% by weight of diethylphosphinic salt and 0.01% to 0.75% by weight of acetate.

The noncombustible additions may preferably also be sulfites.

Preferred sulfites are those with cations of the alkali metals and with cations of protonated nitrogen bases, for example of ammonia or primary, secondary, tertiary and quaternary amines, and with cations of the alkaline earth metals; with cations of the elements of the third main group; with cations of the transition group elements. Particularly preferred transition group elements here are titanium, iron, zinc and mixtures thereof.

Preferred sulfites are those with cations of the metals Mg, Ca, Al, Sb, Sn, Ge, Ti, Fe, Zr, Zn, Ce, Bi, Sr, Mn, Li, Na, K and/or a protonated nitrogen base.

Particular preference is given to sodium metabisulfite, sodium sulfite, sodium bisulfite, potassium metabisulfite, potassium sulfite, potassium bisulfite and potassium hydrogensulfate.

Preferred inventive halogen-free flame retardant mixtures comprising sulfite as noncombustible addition are:

I) Halogen-free flame retardant mixture comprising 1% to 99% by weight of a component A and 1% to 99% by weight of aluminum phosphite, where component A comprises 95% to 99.995% by weight of diethylphosphinic salt and 0.005% to 5% by weight of sulfite.

II) Halogen-free flame retardant mixture comprising 10% to 90% by weight of a component A and 10% to 90% by weight of aluminum phosphite, where component A comprises 95% to 99.995% by weight of diethylphosphinic salt and 0.005% to 5% by weight of sulfite.

III) Halogen-free flame retardant mixture comprising 20% to 80% by weight of a component A and 20% to 80% by weight of aluminum phosphite, where component A comprises 95% to 99.995% by weight of diethylphosphinic salt and 0.005% to 5% by weight of sulfite.

IV) Halogen-free flame retardant mixture comprising 1% to 99% by weight of a component A and 1% to 99% by weight of aluminum phosphite, where component A comprises 99.18% to 99.99% by weight of diethylphosphinic salt and 0.01% to 0.82% by weight of sulfite.

Overall preference is thus given to halogen-free flame retardant mixtures comprising 1% to 99% by weight of a component A and 1% to 99% by weight of a component B, where component A comprises 95% to 99.995% by weight of a diethylphosphinic salt of the and 0.005% to 5% by weight of sulfates, phosphates, phosphonates, nitrates, chlorides, sulfites and/or acetates, and component B is aluminum phosphite.

The term "aluminum phosphite" in the context of the invention covers a number of compounds as defined hereinafter.

The inventive aluminum phosphites include a mixed alkali metal aluminum phosphite of the formula $$Al_{2.00}M_z(HPO_3)_y(OH)_v*(H_2O)_w \qquad (II)$$

in which
M is alkali metal ions,
z is 0.01 to 1.5,
y is 2.63 to 3.5,
v is 0 to 2 and w is 0 to 4.

One such inventive aluminum phosphite is a mixture of $Al_2(HPO_3)_3*nH_2O$ (with n=0-4) and sodium aluminum phosphite. This sodium aluminum phosphite corresponds to the formula (II), for example the empirical formula $$Al_{2.0}Na_{0.6}(HPO_3)_{2.89}*0.28H_2O.$$

The x-ray powder data of sodium aluminum phosphite are given in example 78 and the x-ray powder data of $Al_2(HPO_3)_3*4H_2O$ for comparison in example 82.

Inventive aluminum phosphite is also a mixture of 0%-99.9% by weight of $Al_2(HPO_3)_3*nH_2O$ and 0.1%-100% by weight of sodium aluminum phosphite.

A preferred inventive aluminum phosphite is a mixture of 1%-50% by weight of $Al_2(HPO_3)_3*nH_2O$ and 1%-50% by weight of sodium aluminum phosphite.

Very particular preference is given to an inventive aluminum phosphite composed of a mixture of 5%-75% by weight of $Al_2(HPO_3)_3*nH_2O$ and 5%-25% by weight of sodium aluminum phosphite.

Another aluminum phosphite usable in accordance with the invention is a mixed alkali metal aluminum phosphite of the formula $$Al_xM_z(HPO_3)_y(OH)_v*(H_2O)_w \qquad (II)$$

in which
x is 1.00 to 2.0,
M is alkali metal ions,
z is 0.01 to 2.7,
y is 2.63 to 3.5,
v is 0 to 2 and w is 0 to 6.

Yet another inventive usable aluminum phosphite is a mixture of the following composition:
80%-99.9% by weight of $Al_2(HPO_3)_3$
0.1%-25% by weight of water
0%-10% by weight of sulfate
0%-15% by weight of sodium
0%-10% by weight of phosphate.

Likewise usable in accordance with the invention is an aluminum phosphite is one of the following composition:
80%-99.9% by weight of $Al_2(HPO_3)_3$
0.1%-25% by weight of water
0%-14.8% by weight of sodium sulfate
0%-7.4% by weight of sodium phosphate.

Another of the inventive usable aluminum phosphites is the aluminum hydrogenphosphite of the formula (III)

$$Al_{2.00}(HPO_3)_u(H_2PO_3)_t*(H_2O)_s \qquad (III)$$

in which
u is 2 to 2.99,
t is 2 to 0.01 and
s is 0 to 4.

Aluminum phosphite usable in accordance with the invention is also a mixture of aluminum phosphite with sparingly soluble aluminum salts and nitrogen-free foreign ions, comprising 80% to 99.898% by weight of aluminum phosphite of the formula (I)

$$Al_2(HPO_3)_3*H_2O \qquad (I)$$

in which
x is 0 to 4,
0.1% to 10% by weight of sparingly soluble aluminum salts and
0.002% to 10% by weight of nitrogen-free foreign ions.

Preferably, the sparingly soluble aluminum salts are aluminum hydroxide, hydroxyaluminum chloride, polyaluminum hydroxy compounds, aluminum carbonates, hydrotalcites $(Mg_6Al_2(OH)_{16}COO_3 \cdot nH_2O)$, dihydroxyaluminum sodium carbonate $(NaAl(OH)_2CO_3)$, aluminum oxides, aluminum oxide hydrate, mixed aluminum oxide hydroxides, basic aluminum sulfate and/or alunite.

Preferably, the nitrogen-free foreign ions are chlorides, complex chlorides, bromides; hydroxides, peroxides, peroxide hydrates, sulfites, sulfates, sulfate hydrates, acidic sulfates, hydrogensulfates, peroxosulfates, peroxodisulfates; nitrates; carbonates, percarbonates, stannates; borates, perborates, perborate hydrates; formates, acetates, propionates, lactates and/or ascorbates and/or cations of the elements Li, Na, K, Mg, Ca, Ba, Pb, Sn, Cu, Zn, La, Ce, Ti, Zr, V, Cr, Mn, Fe, Co and/or Ni.

Aluminum phosphite usable in accordance with the invention is additionally also a mixture of aluminum hydrogenphosphites of the formula (III)

$$Al_{2.00}(HPO_3)_u(H_2PO_3)_t \cdot (H_2O)_s \qquad (III)$$

with aluminum salts, comprising
91% to 99.9% aluminum hydrogenphosphites of the formula (III)
0.1% to 9% aluminum salts and
0% to 50% water (of crystallization),
where, in formula (III),
u is 2 to 2.99,
t is 2 to 0.01 and
s is 0 to 4.

Aluminum phosphites usable in accordance with the invention include aluminum phosphite $(Al(H_2PO_3)_3)$, secondary aluminum phosphite, basic aluminum phosphite $(Al(OH)(H_2PO_3)_2 \cdot 2aq)$, aluminum phosphite tetrahydrate $(Al_2(HPO_3)_3 \cdot 4aq)$, $Al_7(HPO_3)_9(OH)_6(hexane-1,6-diamine)_{1.5} \cdot 12H_2O$, $Al_2(HPO_3)_3 \cdot xAl_2O_3 \cdot nH_2O$ with x=2.27-1 and/or $Al_4H_6P_{16}O_{18}$.

Preferably, the residual moisture content of the inventive halogen-free flame retardant mixture is 0.01% to 10% by weight, especially 0.1% to 2% by weight.

Preferably, the median particle size $d_{50}$ of the inventive halogen-free flame retardant mixture is 0.1 to 1000 μm, especially 10 to 100 μm.

Preferably, the bulk density of the inventive halogen-free flame retardant mixture is 80 to 800 g/L, especially 200 to 700 g/L.

The free flow of the inventive halogen-free flame retardant mixture is determined according to Pfrengle (DIN ISO 4324 Surface active agents; powders and granules; measurement of the angle of repose, December 1983, Beuth Verlag Berlin).

According to this, the aforementioned free flow is determined by the determination of the height of the cone of a powder or granular material or the ratio of cone radius to cone height. The cone is produced by pouring a specific amount of the substance to be examined through a specific funnel in a defined apparatus. The defined cone radius is produced by pouring the cone until the product flows over a circular plate raised from the base. The radius of the plate is fixed. The funnel has an internal diameter of 10 mm. The plate has a radius of 50 mm. 5 determinations are conducted and averaged. The height is measured in millimeters with a scale proceeding from the plate up to the peak of the cone. The ratio of cone radius (50 mm) to cone height is calculated from the mean value.

Using a halogen-free flame retardant mixture according to the prior art, cone of repose heights of 29.9 to 49.9 mm, corresponding to a span of 20 mm, were determined, and ratios of radius to height (=cot alpha) of 1.67 to 1.00, corresponding to a span of 0.67.

The inventive halogen-free flame retardant mixtures can be produced by various methods.

Preference is given to mixing aluminum diethylphosphinate directly with the noncombustible addition and aluminum phosphite.

Preference is also given to mixing aluminum diethylphosphinate comprising the noncombustible addition with aluminum phosphite.

According to the invention, the aluminum diethylphosphinate comprising the noncombustible addition is produced by reacting diethylphosphinic acid with elemental metal or a metal salt at 0 to 300° C. for 0.01 to 1 hour.

Preferred metal salts are metal oxides, mixed metal oxide hydroxides, hydroxides, etc.

In another embodiment of the invention, the aluminum diethylphosphinate comprising the noncombustible addition is produced by reacting a diethylphosphinic acid with a free base at 0 to 300° C. for 0.01 to 1 hour.

In a further embodiment, the aluminum diethylphosphinate comprising the noncombustible addition is produced by reacting a diethylphosphinic acid in the form of an alkali metal salt with a salt of the desired cation at 0 to 300° C. for 0.01 to 1 hour.

Preferred alkali metal salts are sodium and potassium salts.

Preferred salts that afford the desired cations are acetates, hydroxoacetates, chlorides, hydroxochlorides, nitrates, sulfates, hydroxosulfates, phosphonates and phosphites. Preferably, the concentration thereof in aqueous solution is 5% to 95% (anhydrous solid), more preferably 20% to 50% by weight.

In another embodiment, the aluminum diethylphosphinate comprising the noncombustible addition is produced by reacting a diethylphosphinic acid in the form of a reactive derivative with a derivative of the desired cation at 0 to 300° C. for 0.01 to 1 hour. Preferred diethylphosphinic acid derivatives are diethylphosphinic esters and pyroesters and diethylphosphinyl chlorides, phosphates, acetates, phenoxides, etc.

In the embodiment in which the aluminum diethylphosphinate comprises dialkylphosphinic acid telomers as noncombustible addition, the dialkylphosphinic acid telomer content is 50 ppm to 15% by weight, more preferably 1000 ppm to 8% by weight.

In the embodiment in which the aluminum diethylphosphinate comprises sulfate as noncombustible addition, the sulfate content is 50 ppm to 5% by weight, more preferably 100 ppm to 9000 ppm.

In the embodiment in which the aluminum diethylphosphinate comprises phosphate as noncombustible addition, the phosphate content is 50 ppm to 5% by weight, more preferably 500 ppm to 7000 ppm.

In the embodiment in which the aluminum diethylphosphinate comprises organylphosphonate as noncombustible addition, the organylphosphonate content is 50 ppm to 5% by weight, more preferably 500 ppm to 2% by weight.

In the embodiment in which the aluminum diethylphosphinate comprises nitrate as noncombustible addition, the nitrate content is 50 ppm to 5% by weight, more preferably 100 ppm to 2100 ppm.

In the embodiment in which the aluminum diethylphosphinate comprises chloride as the noncombustible addition, the chloride content is 50 ppm to 5% by weight, more preferably 100 ppm to 5000 ppm.

In the embodiment in which the aluminum diethylphosphinate comprises acetate as the noncombustible addition, the acetate content is 50 ppm to 5% by weight, more preferably 100 ppm to 7500 ppm.

In the embodiment in which the aluminum diethylphosphinate comprises sulfite as the noncombustible addition, the acetate content is 50 ppm to 5% by weight, more preferably 100 ppm to 8200 ppm.

The invention also encompasses flame-retardant polymer molding compositions comprising
1% to 50% by weight of the inventive halogen-free flame retardant mixture,
1% to 99% by weight of polymer or mixtures thereof,
0% to 60% by weight of additives and
0% to 60% by weight of filler.

The invention preferably encompasses flame-retardant polymer molding compositions comprising
5% to 30% by weight of the inventive halogen-free flame retardant mixture,
15% to 85% by weight of polymer or mixtures thereof,
5% to 40% by weight of additives and
5% to 40% by weight of filler.

Preferably, the polymers are from the group of the thermoplastic polymers such as polyester, polystyrene or polyamide and/or the thermoset polymers.

The polymers are preferably polymers of mono- and diolefins, for example polypropylene, polyisobutylene, polybutene-1, poly-4-methylpentene-1, polyisoprene or polybutadiene, and also polymers of cycloolefins, for example of cyclopentene or norbornene; and also polyethylene (which may optionally be crosslinked), e.g. high-density polyethylene (HDPE), high-density high-molar mass polyethylene (HDPE-HMW), high-density ultrahigh-molar mass polyethylene (HDPE-UHMW), medium-density polyethylene (MDPE), low-density polyethylene (LDPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

The polymers are preferably hydrocarbon resins (e.g. $C_5$-$C_9$), including hydrogenated modifications thereof (e.g. tackifier resins) and mixtures of polyalkylenes and starch.

The polymers are preferably polystyrene (Polystyrol® 143E (BASF), poly(p-methylstyrene), poly(alpha-methylstyrene).

The polymers are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; more impact-resistant mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene onto polybutadiene, styrene onto polybutadiene-styrene or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkyl acrylates or polyalkyl methacrylates, styrene and acrylonitrile onto acrylate-butadiene copolymers, and mixtures thereof, as known, for example, as ABS, MBS, ASA or AES polymers.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

The polymers are preferably polymers which derive from alpha, beta-unsaturated acids and derivatives thereof, such as polyacrylates and polymethacrylates, polymethyl methacrylates, polyacrylamides and polyacrylonitriles impact-modified with butyl acrylate, and copolymers of the monomers mentioned with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers which derive from unsaturated alcohols and amines or the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals such as polyoxymethylene, and those polyoxymethylenes which contain comonomers, for example ethylene oxide; polyacetals which have been modified with thermoplastic polyurethanes, acrylates or MBS.

The polymers are preferably polyphenylene oxides and sulfides and mixtures thereof with styrene polymers or polyamides.

The polymers are preferably polyurethanes which derive from polyethers, polyesters and polybutadienes having both terminal hydroxyl groups and aliphatic or aromatic polyisocyanates, and the precursors thereof.

The polymers are preferably polyamides and copolyamides which derive from diamines and dicarboxylic acids and/or from aminocarboxylic acids or the corresponding lactams, such as nylon-2/12, nylon-4 (poly-4-aminobutyric acid, Nylon® 4, from DuPont), nylon-4/6 (poly(tetramethyleneadipamide), Nylon® 4/6, from DuPont), nylon-6 (polycaprolactam, poly-6-aminohexanoic acid, Nylon® 6, from DuPont, Akulon® K122, from DSM; Zytel® 7301, from DuPont; Durethan® B 29, from Bayer), nylon-6/6 (poly(N,N'-hexamethyleneadipamide), Nylon® 6/6, from DuPont, Zytel® 101, from DuPont; Durethan® A30, Durethan® AKV, Durethan® AM, from Bayer; Ultramid® A3, from BASF), nylon-6/9 (poly(hexamethylenenonanamide), Nylon® 6/9, from DuPont), nylon-6/10 (poly(hexamethylenesebacamide), Nylon® 6/10, from DuPont), nylon-6/12 (poly(hexamethylenedodecanediamide), Nylon® 6/12, from DuPont), nylon-6/6,6 (poly(hexamethyleneadipamide-co-caprolactam), Nylon® 6/66, from DuPont), nylon-7 (poly-7-aminoheptanoic acid, Nylon® 7, from DuPont), nylon-7,7 (polyheptamethylenepimelamide, Nylon® 7,7, from DuPont), nylon-8 (poly-8-aminooctanoic acid, Nylon® 8, from DuPont), nylon-8,8 (polyoctamethylenesuberamide, Nylon® 8,8, from DuPont), nylon-9 (poly-9-aminononanoic acid, Nylon® 9, from DuPont), nylon-9,9 (polynonamethyleneazelamide, Nylon® 9,9, from DuPont), nylon-10 (poly-10-aminodecanoic acid, Nylon® 10, from DuPont), nylon-10,9 (poly(decamethyleneazelamide), Nylon® 10,9, from DuPont), nylon-10,10 (polydecamethylenesebacamide, Nylon® 10,10, from DuPont), nylon-11 (poly-11-aminoundecanoic acid, Nylon® 11, from DuPont), nylon-12 (polylauryllactam, Nylon® 12, from DuPont, Grillamid® L20, from Ems Chemie), aromatic polyamides proceeding from m-xylene, diamine and adipic acid; polyamides prepared from hexamethylenediamine and iso- and/or terephthalic acid (polyhexamethyleneisophthalamide, polyhexamethyleneterephthalamide) and optionally an elastomer as a modifier, e.g. poly-2,4,4-trimethylhexamethyleneterephthalamide or poly-m-phenyleneisophthalamide. Block copolymers of the aforementioned polyamides with polyolefins, olefin copolymers, ionomers or chemically bonded or grafted elastomers; or with polyethers, for example with polyethylene glycol, polypropylene glycol or polytetramethylene glycol. In addition, polyamides or copolyamides modified with EPDM or ABS; and polyamides condensed during processing ("RIM polyamide systems").

It is also possible to use aromatic polyamides such as PA4T, PA6T, PA9T, PA10T, PA11T and/or MXD6, amorphous polyamides such as 6I/X and TPE-A "rigid" and "soft".

The polymers are preferably also polyureas, polyimides, polyamidimides, polyetherimides, polyesterimides, polyhydantoins and polybenzimidazoles. The polymers are preferably polyesters which derive from dicarboxylic acids and dialcohols and/or from hydroxycarboxylic acids or the corresponding lactones, such as polyethylene terephthalate, polybutylene terephthalate (Celanex® 2500, Celanex® 2002, from Celanese; Ultradur®, from BASF), poly-1,4-dimethylolcyclo-hexane terephthalate, polyhydroxybenzoates, and block polyether esters which derive from polyethers with hydroxyl end groups; and also polyesters modified with polycarbonates or MBS.

The polymers are preferably polycarbonates and polyester carbonates, and also polysulfones, polyether sulfones and polyether ketones.

Preferably, the polymers are crosslinked polymers which derive from aldehydes on the one hand, and phenols, urea or melamine on the other hand, such as phenol-formaldehyde, urea-formaldehyde and melamine-formaldehyde resins.

The polymers are preferably drying and nondrying alkyd resins.

The polymers are preferably unsaturated polyester resins which derive from copolyesters of saturated and unsaturated dicarboxylic acids with polyhydric alcohols, and vinyl compounds as crosslinking agents, and also the halogenated, flame-retardant modifications thereof.

The polymers are preferably crosslinkable acrylic resins which derive from substituted acrylic esters, for example from epoxy acrylates, urethane acrylates or polyester acrylates.

Preferably, the polymers are alkyd resins, polyester resins and acrylate resins which have been crosslinked with melamine resins, urea resins, isocyanates, isocyanurates, polyisocyanates or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

Preferably, the polymers are mixtures (poly blends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylate, POM/thermoplastic PUR, PC/thermoplastic PUR, POM/acrylate, POM/MBS, PPO/HIPS, PPO/PA 66 and copolymers, PA/HDPE, PA/PP, PA/PPO, PBT/PC/ABS or PBT/PET/PC.

Preferred additives for the inventive halogen-free flame retardant mixtures are, for example, synergists.

According to the invention, preferred synergists are melamine phosphate, dimelamine phosphate, pentamelamine triphosphate, trimelamine diphosphate, tetrakismelamine triphosphate, hexakismelamine pentaphosphate, melamine diphosphate, melamine tetraphosphate, melamine pyrophosphate, melamine polyphosphates, melam polyphosphates, melem polyphosphates and/or melon polyphosphates.

Further preferred synergists are melamine condensation products such as melam, melem and/or melon.

According to the invention, further preferred synergists are oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, urea cyanurate, dicyandiamide and/or guanidine.

According to the invention, further preferred synergists are nitrogen-containing phosphates of the formulae $(NH_4)_y H_{3-y} PO_4$ or $(NH_4PO_3)_z$ with y=1 to 3 and z=1 to 10 000.

Preferred further additives in the inventive flame retardant compositions are zinc compounds, e.g. zinc oxide, zinc hydroxide, tin oxide hydrate, zinc carbonate, zinc stannate, zinc hydroxystannate, basic zinc silicate, zinc phosphate, zinc borate, zinc molybdate or zinc sulfides.

Preferred further additives in the inventive flame retardant compositions are those from the group of the carbodiimides and/or (poly)isocyanates.

Preferred further additives come from the group of the sterically hindered phenols (e.g. Hostanox® OSP 1), sterically hindered amines and light stabilizers (e.g. Chimasorb® 944, Hostavin® products), phosphonites and antioxidants (e.g. Sandostab® P-EPQ from Clariant) and separating agents (Licomont® products from Clariant).

Preferred further fillers in the inventive flame retardant compositions are oxygen compounds of silicon, magnesium compounds, e.g. metal carbonates of metals of the second main group of the Periodic Table, magnesium oxide, magnesium hydroxide, hydrotalcites, dihydrotalcite, magnesium carbonates or magnesium calcium carbonates, calcium compounds, e.g. calcium hydroxide, calcium oxide, hydrocalumite, aluminum compounds, e.g. aluminum oxide, aluminum hydroxide, boehmite, gibbsite or aluminum phosphate, red phosphorus, zinc compounds or aluminum compounds; and likewise glass fibers and glass beads.

Compounding units usable in accordance with the invention are multizone screw extruders having three-zone screws and/or short compression screws; including co-kneaders, for example from Coperion Buss Compounding Systems, Pratteln, Switzerland, e.g. MDK/E46-11 D, and/or laboratory kneaders (MDK 46 from Buss, Switzerland with L=11D).

Other compounding units usable in accordance with the invention are twin-screw extruders, for example from Coperion Werner & Pfleiderer GmbH & Co. KG, Stuttgart (ZSK 25, ZSK30, ZSK 40, ZSK 58, ZSK MEGAcompounder 40, 50, 58, 70, 92, 119, 177, 250, 320, 350, 380) and/or from Berstorff GmbH, Hanover, Leistritz Extrusionstechnik GmbH, Nuremberg.

Compounding units usable in accordance with the invention are ring extruders, for example from 3+Extruder GmbH, Laufen, having a ring of three to twelve small screws which rotate about a static core, and/or planetary roll extruders, for example from Entex, Bochum, and/or devolatilizing extruders and/or cascade extruders and/or Maillefer screws.

Compounding units usable in accordance with the invention are compounders having a contrarotatory twin screw set, for example Compex 37 or 70 products from Krauss-Maffei Berstorff.

Inventive effective screw lengths in the case of single-shaft extruders or single-screw extruders are 20 to 40 D.

Inventive effective screw lengths (L) in the case of multizone screw extruders are, for example, 25 D with intake zone (L=10 D), transition zone (L=6 D), ejection zone (L=9 D).

Screw lengths effective in accordance with the invention in the case of twin-screw extruders are 8 to 48 D.

Production, Processing and Testing of Flame-Retardant Polymer Molding Compositions and Polymer Moldings The flame retardant components are mixed with the polymer granules and any additives and incorporated via the side intake of a twin-screw extruder (Leistritz ZSE 27/44 D type) at temperatures of 230 to 260° C. (glass fiber-reinforced PBT), at 260-310° C. into PA 66 or at 250-275° C. into PA 6. The glass fibers were added via a second side intake. The homogenized polymer strand was drawn off, cooled in a water bath and then pelletized.

After sufficient drying, the molding compositions were processed in an injection molding machine (Arburg 320 C Allrounder type) at melt temperatures of 240 to 300° C. to give test specimens and tested and classified for flame retardancy by the UL 94 test (Underwriter Laboratories).

Identification of the telomers and the determination of the content thereof: The $^{31}$P NMR spectra are measured with a Jeol JNM-ECS-400 instrument, a 400 MHz NMR instrument from JEOL (Germany) GmbH. A sample of 100-150 mg is dissolved in 2 mL of 10% by weight NaOD/D$_2$O by gently heating the sample to about 40° C. The measurement is conducted in {$^1$H}-decoupled mode with 2048 scans.

With the aid of table 9, the $^{31}$P NMR signals of the telomers can be inferred from a $^{31}$P NMR spectrum. The $^{31}$P NMR integration values give the percentage of $^{31}$P nuclei based on all the $^{31}$P nuclei in the sample. For each substance, these values are multiplied by an individual factor (f=MW (telomer as Al salt) divided by 3*AW(phosphorus) [MW: molecular weight, AW: atomic weight]. All such values plus the value for the diethylphosphinate salt are added up and an intermediate sum total is thus determined. The values for each isomer multiplied by 100 and divided by the intermediate sum total gives the telomer content in % by weight.

The assignment of the chemical structures of the telomers to the $^{31}$P NMR signals can be accomplished by combination of the $^{31}$P NMRs and a) the intensities of the signals with LC/MS (combination of liquid chromatography and mass spectroscopy analysis), b) by specific synthesis of the telomers and spiking of the $^{31}$P samples with reference materials thus obtained or c) by combination of $^{31}$P NMR and $^{13}$C NMR spectroscopy.

Diethylphosphinate with molar mass 122 g/mol is the most intense peak in LC-MS and in the $^{31}$P NMR as well. The molar mass of 122 only permits the diethylphosphinate structure; the $^{31}$P NMR chemical shift found is listed in table 9. n-Butylethylphosphinate and i-butylethylphosphinate in the LC-MS have the molar mass of 150 g/mol. This molar mass permits only the "n-butylethylphosphinate" and "i-butylethylphosphinate" structure. n-Butyl is more intense in LC/MS and in $^{31}$P NMR than i-butyl. Consequently, the more intense signal (to the right of diethyl) is n-butylethylphosphinate, and the less intense signal (to the left of diethyl) is i-butylethylphosphinate. The signal positions found are listed in table 9.

Aluminum tri(n-butylethylphosphinate) can be chemically in multiple steps by butyl group addition onto hypophosphorous acid, subsequent ethyl group arrangement, formation of the butylethylphosphinic acid sodium salt with sodium hydroxide solution and reaction with aluminum sulfate solution in H$_2$O. To identify n-butylethylphosphinate, the product can be used by spiking in unknown samples. The identity of the alkyl groups is thus defined unambiguously by the choice of raw materials.

i-Butylethylphosphinate can be identified by recording a $^{13}$C NMR and a DEPT-135 spectrum. "DEPT" stands for Distortionless Enhancement by Polarization Transfer. It is a helpful method for distinguishing between CH, CH$_2$ and CH$_3$ groups.

The CH group characteristic of the i-butyl group (—CH (—CH$_3$)—CH$_2$—CH$_3$) gives a signal at 33.7 ppm (with a $^1$Jpc coupling of 91 Hz). $^1$Jpc coupling is defined as the coupling of the phosphorus nucleus via a covalent bond to the next carbon nucleus.

TABLE 9

$^{31}$P NMR chemical shift of telomers

| Dialkylphosphinic acid aluminum salt | $^{31}$P NMR, chemical shift [ppm] |
|---|---|
| Aluminum tris(diethylphosphinate) | 50.435-49.785 |
| Aluminum tris(i-butylethylphosphinate) | 51.830-51.752 |
| Aluminum tris(n-butylethylphosphinate) | 49.031-48.866 |
| Aluminum tris(n-hexylethylphosphinate) | 48.693-48.693 |
| Aluminum tris(sec-hexylethylphosphinate) | approx. 51.72 |
| Aluminum tris(di-n-butylphosphinate) | 47.696-47.622 |
| Aluminum tris(di-sec-butylphosphinate) | 52.861-52.861 |
| Aluminum tris(n-octylethylphosphinate) | 46.795-46.795 |

EXAMPLE 1

An aluminum diethylphosphinate containing added telomers is prepared by dissolving 2.2 kg (20.7 mol) of sodium hypophosphite 1-hydrate in 8 kg (7.62 L) of acetic acid and initially charging a jacketed 16 L steel/enamel pressure reactor with said solution. After heating the reaction mixture to 85° C., ethylene was introduced into the reactor via a reducing valve set to 7 bar until saturation. The reaction was started with constant stirring by metered addition of a solution of 56 g (1 mol %) of 2,2'-azobis(2-amidinopropane) dihydrochloride in 250 mL of water and was controlled via the rate of metered addition of the free-radical initiator in such a way that the reaction temperature in the reactor, at a jacket temperature of 80° C. with constant supply of ethylene at a mean pressure of about 7 bar, did not rise above 95° C. The total metering time was 3 hours. Thereafter, the mixture was left to react at 85° C. for another 3 h. The reactor was decompressed and cooled to room temperature.

The resultant solution was very substantially freed of the acetic acid solvent on a rotary evaporator and then 15.9 L of water were added. Within three hours, 4333 g (6.9 mol of Al) of an aqueous aluminum sulfate solution with aluminum content 4.3% by weight were added. Subsequently, the solid obtained was filtered off, washed twice in succession with 2 L of water each time and dried at 130° C. under reduced pressure.

The product contains 15.9% by weight of aluminum butylethylphosphinate and 0.2% by weight of residual moisture.

EXAMPLE 2

Example 1 is repeated with ethylene pressure 3 bar and 95.2 g of sodium peroxodisulfate. The product contains 5.8 by weight of aluminum ethylphosphonate.

EXAMPLE 3

800 g of a solution as obtained in example 1 is decompressed and cooled and then diluted with 2500 mL of acetic acid and then 42 g (0.54 mol) of aluminium hydroxide are added. Then the mixture was heated under reflux for about 4 hours, cooled and filtered. The resultant solid was washed with 1 L of glacial acetic acid and then dried at 130° C. under reduced pressure. The product contains 5.8% by weight of aluminum acetate.

EXAMPLE 4 (COMPARISON)

Aluminum diethylphosphinate and aluminum phosphite (amounts in table 1) are weighed into a polyethylene bottle so as to give about 1 kg of flame retardant mixture. The mixture is mixed in an overhead mixer for about 2 hours until homogeneity has been achieved.

EXAMPLES 5 TO 13

Aluminum diethylphosphinate containing an addition of telomers is weighed together with aluminum phosphite (amounts in table 1) into a polyethylene bottle so as to result in about 1 kg of flame retardant mixture in each case and the latter is mixed in an overhead mixer for about 2 hours until homogeneity has been achieved. Experiments show more uniform free flow in the case of the products of examples 5 to 13 than in the case of the product without additions from comparative example 4.

Particularly good results are shown by the combinations of aluminum butylethylphosphinate and secondary aluminum phosphite (example 6) or of aluminium butylethylphosphinate and mixed alkali metal aluminum phosphite (example 12).

EXAMPLES 14 AND 15

Aluminum diethylphosphinate containing added telomers is weighed into a polyethylene bottle together with mixtures of $Al_2(HPO_3)_3*4H_2O$ and sodium aluminum phosphite from example 80 or 81 which have been dried beforehand at 220° C. to a residual moisture content of 0.5% by weight, so as to give about 1 kg of flame retardant mixture and the latter is mixed in an overhead mixer for about 2 hours until homogeneity has been achieved.

EXAMPLES 16 TO 24

Aluminum diethylphosphinate containing added sulfate is weighed into a polyethylene bottle together with aluminum phosphite so as to give about 1 kg of flame retardant mixture and the latter is mixed in an overhead mixer for about 2 hours until homogeneity has been achieved. Experiments show more uniform free flow in the case of the products of examples 16 to 24 than in the case of the product without additions from comparative example 4.

EXAMPLES 25 TO 33

Aluminum diethylphosphinate containing added phosphate is weighed into a polyethylene bottle together with aluminum phosphite so as to give about 1 kg of flame retardant mixture and the latter is mixed in an overhead mixer for about 2 hours until homogeneity has been achieved. Experiments show more uniform free flow in the case of the products of examples 25 to 33 than in the case of the product without additions from comparative example 4.

EXAMPLES 34 TO 42

Aluminum diethylphosphinate containing added phosphonate is weighed into a polyethylene bottle together with aluminum phosphite so as to give about 1 kg of flame retardant mixture. The mix is mixed in an overhead mixer for about 2 hours until homogeneity has been achieved. The experiments show more uniform free flow than without additions in comparative example 4.

EXAMPLES 43 TO 51

Aluminum diethylphosphinate containing added nitrate is weighed into a polyethylene bottle together with aluminum phosphite so as to give about 1 kg of flame retardant mixture. The mix is mixed in an overhead mixer for about 2 hours until homogeneity has been achieved. The experiments show more uniform free flow than without additions in comparative example 4.

EXAMPLES 52 TO 60

Aluminum diethylphosphinate containing added chloride is weighed into a polyethylene bottle together with aluminum phosphite so as to give about 1 kg of flame retardant mixture. The mix is mixed in an overhead mixer for about 2 hours until homogeneity has been achieved. The experiments show more uniform free flow than without additions in comparative example 4.

EXAMPLES 61 TO 69

Aluminum diethylphosphinate containing added acetate is weighed into a polyethylene bottle together with aluminum phosphite so as to give about 1 kg of flame retardant mixture. The mix is mixed in an overhead mixer for about 2 hours until homogeneity has been achieved. The experiments show more uniform free flow than without additions in comparative example 4.

EXAMPLE 70

According to the general method, a mixture of 50% by weight of nylon-6,6, 20% by weight of halogen-free flame retardant mixture from example 12 and 30% by weight of glass fibers is processed to give a flame-retardant polymer molding composition. After drying, the molding compositions are processed in an injection molding machine to give polymer moldings. A UL-94 classification of V-0 was determined.

EXAMPLES 71 TO 77

According to example 70, flame-retardant polymer molding compositions based on nylon-6, nylon-4,6 and polybutylene terephthalate are processed. After drying, the molding compositions are processed in an injection molding machine to give polymer moldings. A UL-94 classification of V-0 was determined.

TABLE 1

Flame retardant mixtures of diethylphosphinic salt, telomers and aluminum phosphite

| | Example | | | | | |
|---|---|---|---|---|---|---|
| | 4 comp. | 5 | 6 | 7 | 8 | 9 |
| Diethylphosphinic salt [% by wt.] | 80 | 99 | 99 | 1 | 90 | 90 |
| Addition | — | aluminum (butyl) ethyl phosphinate | aluminum (butyl)ethyl-phosphinate | aluminum (butyl)ethyl-phosphinate | aluminum (butyl)ethyl-phosphinate | aluminum dibutyl-phosphinate |
| ditto, amount [% by wt.] | | 15.90 | 8.48 | | 15.9 | 8.41 |
| ditto, amount [ppm] | | | | 53 | | |
| Aluminum phosphite | secondary aluminum phosphite $Al_2(HPO_3)_3$ | basic aluminum phosphite $Al(OH)(H_2PO_3)_2 \cdot 2H_2O$ | secondary aluminum phosphite $Al_2(HPO_3)_3$ | $Al_2(HPO_3)_3 \cdot 4H_2O$ | secondary aluminum phosphite $Al_2(HPO_3)_3$ | mixture of $Al_2(HPO_3)_3 \cdot 4H_2O$ wtth sparingly soluble aluminum salts and nitrogen-free foreign ions |
| ditto, amount [% by wt.] | 20 | 1 | 1 | 99 | 10 | 10 |
| Characteristic parameters according to Pfrengle | | | | | | |
| Span of the radius/height ratio (=cot alpha) | 0.67 | 0.48 | 0.39 | 0.5 | 0.48 | 0.39 |
| Span of the cone of repose height [mm] | 20 | 12 | 9 | 13 | 12 | 9 |

| | Example | | | | | |
|---|---|---|---|---|---|---|
| | 10 | 11 | 12 | 13 | 14 | 15 |
| Diethylphosphinic salt [% by wt.] | 10 | 80 | 80 | 50 | 80 | 80 |
| Addition | aluminum (hexyl)ethyl-phosphinate | aluminum dibutyl-phosphinate | aluminum (butyl)ethyl-phosphinate | aluminum (hexyl)ethyl-phosphinate | aluminum (butyl)ethyl-phosphinate | aluminum (butyl)ethyl-phosphinate |

TABLE 1-continued

Flame retardant mixtures of diethylphosphinic salt, telomers and aluminum phosphite

| | | | | | | |
|---|---|---|---|---|---|---|
| ditto, amount [% by wt.] | | 12.6 | 8.5 | | 5.3 | 3.2 |
| ditto, amount [ppm] | 53 | | | 53 | | |
| Aluminum phosphite | aluminum hydrogen-phosphites and aluminum salts | secondary aluminum phosphites $Al_2(HPO_3)_3$ | mixed alkali metal aluminum phosphites | aluminum hydrogen-phosphites | mixture of $Al_2(HPO_3)_3*4H_2O$ dried and sodium aluminum phosphite from example 80 | mixture of $Al_2(HPO_3)_3*4H_2O$ dried and sodium aluminum phosphite from example 81 |
| ditto, amount [% by wt.] | 90 | 20 | 20 | 50 | 20 | 20 |
| Characteristic parameters according to Pfrengle | | | | | | |
| Span of the radius/height ratio (=cot alpha) | 0.5 | 0.48 | 0.35 | 0.5 | 0.39 | 0.35 |
| Span of the cone of repose height [mm] | 13 | 12 | 8 | 13 | 9 | 8 |

TABLE 2

Flame retardant mixtures of diethylphosphinic salt, sulfate and aluminum phosphite

| | Example | | | | |
|---|---|---|---|---|---|
| | 16 | 17 | 18 | 19 | 20 |
| Diethylphosphinic salt [% by wt.] | 99 | 99 | 1 | 90 | 90 |
| Addition | sodium sulfate $Na_2SO_4$ | sodium sulfate $Na_2SO_4$ | sodium sulfate $Na_2SO_4$ | sodium sulfate $Na_2SO_4$ | sodium alunite $NaAl_3(SO_4)_2(OH)_6$ |
| ditto, amount [% by wt.] | 7.4 | | | 7.4 | |
| ditto, amount [ppm] | | 13308 | 74 | | 7874 |
| Aluminum phosphite | basic aluminum phosphite $Al(OH)(H_2PO_3)_2*2H_2O$ | secondary aluminum phosphite $Al_2(HPO_3)_3$ | $Al_2(HPO_3)_3*4H_2O$ | secondary aluminum phosphite $Al_2(HPO_3)_3$ | mixture of $Al_2(HPO_3)_3*4H_2O$ with sparingly soluble aluminum salts and nitrogen-free foreign ions |
| ditto, amount [% by wt.] | 1 | 1 | 99 | 10 | 10 |
| Characteristic parameters according to Pfrengle | | | | | |
| Span of the radius/height ratio (=cot alpha) | 0.5 | 0.42 | 0.5 | 0.5 | 0.42 |
| Span of the cone of repose height [mm] | 13 | 10 | 13 | 13 | 10 |

| | Example | | | |
|---|---|---|---|---|
| | 21 | 22 | 23 | 24 |
| Diethylphosphinic salt [% by wt.] | 10 | 80 | 80 | 50 |
| Addition | basaluminite $Al_4(OH)_{10}SO_4*5H_2O$ | sodium sulfate $Na_2SO_4$ | sodium alunite $NaAl_3(SO_4)_2(OH)_6$ | basaluminite $Al_4(OH)_{10}SO_4*5H_2O$ |
| ditto, amount [% by wt.] | | 7.4 | | |
| ditto, amount [ppm] | 242 | | 7874 | 242 |

TABLE 2-continued

Flame retardant mixtures of diethylphosphinic salt, sulfate and aluminum phosphite

| Aluminum phosphite | aluminum hydrogen-phosphites and aluminum salts | secondary aluminum phosphite $Al_2(HPO_3)_3$ | mixed alkali metal aluminum phosphites | aluminum hydrogen-phosphites |
|---|---|---|---|---|
| ditto, amount [% by wt.] | 90 | 20 | 20 | 50 |
| Characteristic parameters according to Pfrengle | | | | |
| Span of the radius/height ratio (=cot alpha) | 0.56 | 0.48 | 0.42 | 0.5 |
| Span of the cone of repose height [mm] | 15 | 12 | 10 | 13 |

TABLE 3

Flame retardant mixtures of diethylphosphinic salt, phosphate and aluminum phosphite

| | Example | | | |
|---|---|---|---|---|
| | 25 | 26 | 27 | 28 |
| Diethylphosphinic salt [% by wt.] | 99 | 99 | 1 | 90 |
| Addition | aluminum phosphate $AlPO_4$ | aluminum phosphate $AlPO_4$ | aluminum phosphate $AlPO_4$ | aluminum phosphate $AlPO_4$ |
| ditto, amount [% by wt.] | 6.4 | | | 6.4 |
| ditto, amount [ppm] | | 8989 | 64 | |
| Aluminum phosphite | basic aluminum phosphite $Al(OH)(H_2PO_3)_2*2H_2O$ | secondary aluminum phosphite $Al_2(HPO_3)_3$ | $Al_2(HPO_3)_3*4H_2O$ | secondary aluminum phosphite $Al_2(HPO_3)_3$ |
| ditto, amount [% by wt.] | 1 | 1 | 99 | 10 |
| Characteristic parameters according to Pfrengle | | | | |
| Span of the radius/height ratio (=cot alpha) | 0.48 | 0.35 | 0.53 | 0.45 |
| Span of the cone of repose height [mm] | 12 | 8 | 14 | 11 |

| | Example | | | | |
|---|---|---|---|---|---|
| | 29 | 30 | 31 | 32 | 33 |
| Diethylphosphinic salt [% by wt.] | 90 | 10 | 80 | 80 | 50 |
| Addition | sodium dihydrogen-phosphate $NaH_2PO_4$ | aluminum dihydrogen-phosphate $(Al(H_2PO_4)_3)$ | aluminum phosphate $AlPO_4$ | sodium dihydrogen-phosphate $NaH_2PO_4$ | aluminum dihydrogen-phosphate $(Al(H_2PO_4)_3)$ |
| ditto, amount [% by wt.] | | | 6.4 | | |
| ditto, amount [ppm] | 8843 | 56 | | 8843 | 56 |
| Aluminum phosphite | mixture of $Al_2(HPO_3)_3*4H_2O$ with sparingly soluble aluminum salts and nitrogen-free foreign ions | aluminum hydrogen-phosphites and Al salts | secondary aluminum phosphite $Al_2(HPO_3)_3$ | mixed alkali metal aluminum phosphites | aluminum hydrogen-phosphites |
| ditto, amount [% by wt.] | 10 | 90 | 20 | 20 | 50 |

TABLE 3-continued

Flame retardant mixtures of diethylphosphinic salt, phosphate and aluminum phosphite Characteristic parameters according to Pfrengle

| | | | | | |
|---|---|---|---|---|---|
| Span of the radius/height ratio (=cot alpha) | 0.35 | 0.53 | 0.48 | 0.32 | 0.53 |
| Span of the cone of repose height [mm] | 8 | 14 | 12 | 7 | 14 |

TABLE 4

Flame retardant mixtures of diethylphosphinic salt, organylphosphonate and aluminum phosphite

| | Example | | | |
|---|---|---|---|---|
| | 34 | 35 | 36 | 37 |
| Diethylphosphinic salt [% by wt.] | 99 | 99 | 1 | 90 |
| Addition | aluminum ethyl-phosphonate $Al_2(EtPO_3)_3$ | aluminum ethyl-phosphonate $Al_2(EtPO_3)_3$ | aluminum ethyl-phosphonate $Al_2(EtPO_3)_3$ | aluminum ethyl-phosphonate $Al_2(EtPO_3)_3$ |
| ditto, amount [% by wt.] | 5.8 | | | 5.8 |
| ditto, amount [ppm] | | 23330 | 58 | |
| Aluminum phosphite | basic aluminum phosphite $Al(OH)(H_2PO_3)_2 \cdot 2H_2O$ | secondary aluminum phosphite $Al_2(HPO_3)_3$ | $Al_2(HPO_3)_3 \cdot 4H_2O$ | secondary aluminum phosphite $Al_2(HPO_3)_3$ |
| ditto, amount [% by wt.] | 1 | 1 | 99 | 10 |

Characteristic parameters according to Pfrengle

| | | | | |
|---|---|---|---|---|
| Span of the radius/height ratio (=cot alpha) | 0.48 | 0.42 | 0.48 | 0.48 |
| Span of the cone of repose height [mm] | 12 | 10 | 12 | 12 |

| | Example | | | | |
|---|---|---|---|---|---|
| | 38 | 39 | 40 | 41 | 42 |
| Diethylphosphinic salt [% by wt.] | 90 | 10 | 80 | 80 | 50 |
| Addition | disodium ethyl-phosphonate $Na_2(EtPO_3)$ | aluminum phenyl-phosphonate $Al_2(C_6H_5PO_3)_3$ | disodium ethyl-phosphonate $Na_2(EtPO_3)$ | aluminum ethyl-phosphonate $Al_2(EtPO_3)_3$ | aluminum phenyl-phosphonate $Al_2(C_6H_5PO_3)_3$ |
| ditto, amount [% by wt.] | | | 8 | | |
| ditto, amount [ppm] | 9812 | 56 | | 4666 | 29 |
| Aluminum phosphite | mixture of $Al_2(HPO_3)_3 \cdot 4H_2O$ with sparingly soluble aluminum salts and nitrogen-free foreign ions | aluminum hydrogen-phosphites and aluminum salts | secondary aluminum phosphite $Al_2(HPO_3)_3$ | mixed alkali metal aluminum-phosphites | aluminum hydrogen-phosphites |
| ditto, amount [% by wt.] | 10 | 90 | 20 | 20 | 50 |

Characteristic parameters according to Pfrengle

| | | | | | |
|---|---|---|---|---|---|
| Span of the radius/height ratio (=cot alpha) | 0.39 | 0.48 | 0.45 | 0.39 | 0.5 |
| Span of the cone of repose height [mm] | 9 | 12 | 11 | 9 | 13 |

TABLE 5

Flame retardant mixtures of diethylphosphinic salt, nitrate and aluminum phosphite

| | Example | | | |
|---|---|---|---|---|
| | 43 | 44 | 45 | 46 |
| Diethylphosphinic salt [% by wt.] | 99 | 99 | 1 | 90 |
| Addition | aluminum nitrate Al(NO$_3$)$_3$ | aluminum nitrate Al(NO$_3$)$_3$ | aluminum nitrate Al(NO$_3$)$_3$ | aluminum nitrate Al(NO$_3$)$_3$ |
| ditto, amount [% by wt.] | 5.7 | | | 5.7 |
| ditto, amount [ppm] | | 2405 | 57 | |
| Aluminum phosphite | basic aluminum phosphite Al(OH)(H$_2$PO$_3$)$_2$*2H$_2$O | secondary aluminum phosphite Al$_2$(HPO$_3$)$_3$ | Al$_2$(HPO$_3$)$_3$*4H$_2$O | secondary aluminum phosphite Al$_2$(HPO$_3$)$_3$ |
| ditto, amount [% by wt.] | 1 | 1 | 99 | 10 |
| Characteristic parameters according to Pfrengle | | | | |
| Span of the radius/height ratio (=cot alpha) | 0.5 | 0.39 | 0.5 | 0.53 |
| Span of the cone of repose height [mm] | 13 | 9 | 13 | 14 |

| | Example | | | | |
|---|---|---|---|---|---|
| | 47 | 48 | 49 | 50 | 51 |
| Diethylphosphinic salt [% by wt.] | 90 | 10 | 80 | 80 | 50 |
| Addition | sodium nitrate NaNO$_3$ | basic aluminum nitrate Al(OH)(NO$_3$)$_2$ | aluminum nitrate Al(NO$_3$)$_3$ | sodium nitrate NaNO$_3$ | basic aluminum nitrate Al(OH)(NO$_3$)$_2$ |
| ditto, amount [% by wt.] | | | 6 | | |
| ditto, amount [ppm] | 2879 | 68 | | 2879 | 68 |
| Aluminum phosphite | mixture of Al$_2$(HPO$_3$)$_3$*4H$_2$O with sparingly soluble aluminum salts and nitrogen-free foreign ions | aluminum hydrogen-phosphites and aluminum salts | secondary aluminum phosphite Al$_2$(HPO$_3$)$_3$ | mixed alkali metal aluminum phosphites | aluminum hydrogen-phosphites |
| ditto, amount [% by wt.] | 10 | 90 | 20 | 20 | 20 |
| Characteristic parameters according to Pfrengle | | | | | |
| Span of the radius/height ratio (=cot alpha) | 0.42 | 0.5 | 0.5 | 0.39 | 0.5 |
| Span of the cone of repose height [mm] | 10 | 13 | 13 | 9 | 13 |

TABLE 6

Flame retardant mixtures of diethylphosphinic salt, chloride and aluminum phosphite

| | Example | | | |
|---|---|---|---|---|
| | 52 | 53 | 54 | 55 |
| Aluminum diethyl-phosphinate | 99 | 99 | 1 | 90 |
| Addition | aluminum chloride Al(Cl)$_3$ | aluminum chloride Al(Cl)$_3$ | aluminum chloride Al(Cl)$_3$ | aluminum chloride Al(Cl)$_3$ |
| ditto, amount [% by wt.] | 6.3 | | | 6.3 |

TABLE 6-continued

Flame retardant mixtures of diethylphosphinic salt, chloride and aluminum phosphite

| | | | | |
|---|---|---|---|---|
| ditto, amount [ppm] | 6268 | 63 | | |
| Aluminum phosphite | basic aluminum phosphite $Al(OH)(H_2PO_3)_2*2H_2O$ | secondary aluminum phosphite $Al_2(HPO_3)_3$ | $Al_2(HPO_3)_3*4H_2O$ | secondary aluminum phosphite $Al_2(HPO_3)_3$ |
| ditto, amount [% by wt.] | 1 | 1 | 1 | 10 |

Characteristic parameters according to Pfrengle

| | | | | |
|---|---|---|---|---|
| Span of the radius/height ratio (=cot alpha) | 0.45 | 0.35 | 0.48 | 0.5 |
| Span of the cone of repose height [mm] | 11 | 8 | 12 | 13 |

| | Example | | | | |
|---|---|---|---|---|---|
| | 56 | 57 | 58 | 59 | 60 |
| Aluminum diethylphosphinate | 90 | 10 | 80 | 80 | 50 |
| Addition | sodium chloride NaCl | basic aluminum chloride $Al(OH)Cl_2$ | aluminum chloride $Al(Cl)_3$ | sodium chloride NaCl | basic aluminum chloride $Al(OH)Cl_2$ |
| ditto, amount [% by wt.] | | | 6.3 | | |
| ditto, amount [ppm] | 2802 | 81.0 | | 2802 | 81 |
| Aluminum phosphite | mixture of $Al_2(HPO_3)_3*4H_2O$ with sparingly soluble aluminum salts and nitrogen-free foreign ions | aluminum hydrogen-phosphites and aluminum salts | secondary aluminum phosphite $Al_2(HPO_3)_3$ | mixed alkali metal aluminum phosphites | aluminum hydrogen-phosphites |
| ditto, amount [% by wt.] | 10 | 90 | 20 | 20 | 50 |

Characteristic parameters according to Pfrengle

| | | | | | |
|---|---|---|---|---|---|
| Span of the radius/height ratio (=cot alpha) | 0.42 | 0.53 | 0.48 | 0.39 | 0.5 |
| Span of the cone of repose height [mm] | 10 | 14 | 12 | 9 | 13 |

TABLE 7

Flame retardant mixtures of diethylphosphinic salt, acetate and aluminum phosphite

| | Example | | | | |
|---|---|---|---|---|---|
| | 61 | 62 | 63 | 64 | 65 |
| Aluminum diethylphosphinate | 99 | 99 | 1 | 90 | 90 |
| Addition | aluminum acetate $Al(CH_3CO_2)_3$ | aluminum acetate $Al(CH_3CO_2)_3$ | aluminum acetate $Al(CH_3CO_2)_3$ | aluminum acetate $Al(CH_3CO_2)_3$ | sodium acetate $NaCH_3CO_2$ |
| ditto, amount [% by wt.] | 5.8 | | | 5.8 | |
| ditto, amount [ppm] | | 8642 | 58 | | 3890 |
| Aluminum phosphite | basic aluminum phosphite $Al(OH)(H_2PO_3)_2*2H_2O$ | secondary aluminum phosphite $Al_2(HPO_3)_3$ | $Al_2(HPO_3)_3*4H_2O$ | secondary aluminum phosphite $Al_2(HPO_3)_3$ | mixture of $Al_2(HPO_3)_3*4H_2O$ with sparingly soluble aluminum salts and nitrogen-free foreign ions |
| ditto, amount [% by wt.] | 1 | 1 | 99 | 10 | 99 |

TABLE 7-continued

Flame retardant mixtures of diethylphosphinic salt, acetate and aluminum phosphite Characteristic parameters according to Pfrengle

| | | | | | |
|---|---|---|---|---|---|
| Span of the radius/height ratio (=cot alpha) | 0.5 | 0.48 | 0.53 | 0.5 | 0.48 |
| Span of the cone of repose height [mm] | 13 | 12 | 14 | 13 | 12 |

| | | Example | | | |
|---|---|---|---|---|---|
| | | 66 | 67 | 68 | 69 |
| Aluminum diethyl-phosphinate | | 10 | 80 | 80 | 50 |
| Addition | | basic aluminum acetate Al(OH)(CH$_3$CO$_2$)$_2$ | aluminum acetate Al(CH$_3$CO$_2$)$_3$ | sodium acetate NaCH$_3$CO$_2$ | basic aluminum acetate Al(OH)(CH$_3$CO$_2$)$_2$ |
| ditto, amount [% by wt.] | | | 5.8 | | |
| ditto, amount [ppm] | | 69 | | 3890 | 69 |
| Aluminum phosphite | | aluminum hydrogen-phosphites and aluminum salts | secondary aluminum phosphite Al$_2$(HPO$_3$)$_3$ | mixed alkali metal aluminum phosphites | aluminum hydrogen-phosphites |
| ditto, amount [% by wt.] | | 90 | 20 | 20 | 50 |

Characteristic parameters according to Pfrengle

| | | | | | |
|---|---|---|---|---|---|
| Span of the radius/height ratio (=cot alpha) | | 0.53 | 0.5 | 0.42 | 0.48 |
| Span of the cone of repose height [mm] | | 14 | 13 | 10 | 12 |

TABLE 8

Composition of flame-retardant polymer molding compositions and flame retardancy tests on flame-retardant polymer moldings to UL 94

| | | Example | | | | | | | |
|---|---|---|---|---|---|---|---|---|---|
| | | 70 | 71 | 72 | 73 | 74 | 75 | 76 | 77 |
| Nylon-6,6 | [% by wt.] | 50 | 50 | | | | 50 | | |
| Nylon-6 | [% by wt.] | | | 50 | | | | 50 | |
| Nylon-4,6 | [% by wt.] | | | | 50 | | | | 50 |
| Polybutylene terephthalate | [% by wt.] | | | | | 50 | | | |
| Glass fibers PA | [% by wt.] | 30 | 30 | 30 | | | 30 | 30 | |
| Glass fibers PA 46 | [% by wt.] | | | | 30 | | | | 30 |
| Glass fibers PBT | [% by wt.] | | | | | 30 | | | |
| Flame retardant from example 12 | [% by wt.] | 20 | | | | | | | |
| Flame retardant from example 23 | [% by wt.] | | 20 | | | | | | |
| Flame retardant from example 41 | [% by wt.] | | | 20 | | | | | |
| Flame retardant from example 31 | [% by wt.] | | | | 20 | | | | |
| Flame retardant from example 50 | [% by wt.] | | | | | 20 | | | |
| Flame retardant from example 56 | [% by wt.] | | | | | | 20 | | |
| Flame retardant from example 65 | [% by wt.] | | | | | | | 20 | |

TABLE 8-continued

Composition of flame-retardant polymer molding compositions and flame retardancy tests on flame-retardant polymer moldings to UL 94

| | | Example | | | | | | | |
|---|---|---|---|---|---|---|---|---|---|
| | | 70 | 71 | 72 | 73 | 74 | 75 | 76 | 77 |
| Flame retardant from example 15 | [% by wt.] | | 20 | | | | | | |
| UL 94 0.8 mm | [—] | V-0 | V-0 | V-0 | V-0 | V-0 | V-0 | V-0 | V-0 |

Polybutylene terephthalate: Celanex ® 2500, from Ticona
Nylon-6,6: Ultramid ® A3, from BASF
Nylon-6: Zytel ® 7301, from Du Pont
Nylon-4,6: Stanyl ® PA 46, from DSM
Glass fibers PBT: Vetrotex ® EC 10 983, from Saint-Gobain
Glass fibers PA: PPG 3540, from PPG Industries, Inc
Glass fibers PA 46: Vetrotex ® 995, from Saint-Gobain

EXAMPLE 78

3 mol of $Na_2HPO_3$ solution and 2 mol of $Al_2(SO_4)_3$ solution are crystallized in aqueous solution at 150° C. and pH=6.1 over the course of 3 h, filtered off and dried under air. The sodium aluminum phosphite is analyzed by x-ray powder diffractometry. The stoichiometry is $Al_{2.0}Na_{0.6}(HPO_3)_{2.89}*0.28H_2O$

EXAMPLE 78

X-ray Powder Data of Sodium Aluminum Phosphite

| Angle [° 2Th] | Reflection height [cts] |
|---|---|
| 9.7557 | 297.79 |
| 12.6394 | 253.3 |
| 16.3439 | 2427.07 |
| 16.6964 | 1030.74 |
| 17.3912 | 580.89 |
| 18.7844 | 603.35 |
| 19.3678 | 650.66 |
| 23.7489 | 875.42 |
| 26.5675 | 1631.28 |
| 26.9505 | 966.58 |
| 27.2826 | 1227.78 |
| 30.3357 | 943.17 |
| 30.8885 | 769.05 |
| 31.9389 | 660.8 |
| 33.1695 | 1875.34 |
| 33.7547 | 556.79 |
| 34.1478 | 956.04 |

EXAMPLE 79

3 mol of $Na_2HPO_3$ solution and 2 mol of $Al_2(SO_4)_3$ solution are crystallized in aqueous solution at 150° C. and pH=3.5 over the course of 3 h, filtered off and dried under air.

EXAMPLE 80

3 mol of $Na_2HPO_3$ solution and 2 mol of $Al_2(SO_4)_3$ solution are crystallized in aqueous solution at 150° C. and pH=3.5 over the course of 3 h, filtered off and dried under air.

EXAMPLE 81

3 mol of $Na_2HPO_3$ solution and 2.01 mol of $Al_2(SO_4)_3$ solution are crystallized in aqueous solution at 150° C. and pH=2.5 over the course of 3 h, filtered off and dried under air.

EXAMPLE 82

3 mol of $Na_2HPO_3$ solution and 2.1 mol of $Al_2(SO_4)_3$ solution are crystallized in aqueous solution at 150° C. and pH=1 over the course of 6 h, filtered off and dried under air.

EXAMPLE 82

X-ray Powder Data of $Al_2(HPO_3)_3*4H_2O$

| Angle [° 2Th] | Height [cts] |
|---|---|
| 11.7777 | 345.54 |
| 13.6143 | 1270.15 |
| 14.7988 | 993.31 |
| 15.3862 | 494.47 |
| 16.2983 | 596.21 |
| 20.2051 | 1455.68 |
| 22.5312 | 1405.43 |
| 32.9021 | 1440.39 |

EXAMPLES 78 TO 82

X-ray Powder Data of Mixtures of $Al_2(HPO_3)_3*4H_2O$ and Sodium Aluminum Phosphite

| Example | Height of the reflection at 9.7557° 2Th [cts] | Sodium aluminum phosphite content [% by wt] | Sodium content [% by wt.] |
|---|---|---|---|
| 78 | 297.79 | 100.0 | 4.1 |
| 79 | 152.76 | 51.3 | 2.1 |
| 80 | 44.67 | 15.0 | 0.6 |
| 81 | 14.89 | 5.0 | 0.2 |
| 82 (comp.) | 0 | 0.0 | 0.0 |

The invention claimed is:
1. A halogen-free flame retardant mixture comprising: 1% to 99% by weight of a component A; and 1% to 99% by weight of a component B, wherein:
component A comprises 85% to 99.995% by weight of a solid diethylphosphinic salt of the metals Mg, Ca, Al, Sb, Sn, Ge, Ti, Fe, Zr, Zn, Ce, Bi, Sr, Mn, Li, Na, K, of a protonated nitrogen base or a combination thereof, 0.005% to 15% by weight of noncombustible additions, component B is aluminum phosphite,
the noncombustible additions are dialkylphosphinic salts of the formula (IV)

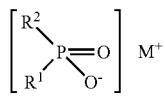

wherein $R^1$ and $R^2$ are the same or different and are each independently ethyl, butyl, hexyl, octyl or a combination thereof and M is Mg, Ca, Al, Sb, Sn, Ge, Ti, Fe, Zr, Zn, Ce, Bi, Sr, Mn, Li, Na, K, a protonated nitrogen base or a combination thereof, with the proviso that $R^1$ and $R^2$ are not both ethyl; and/or
the noncombustible additions are sulfates, phosphates, phosphonates, nitrates, sulfites and/or acetates, where the sulfates, phosphates, phosphonates, nitrates, sulfites and/or acetates are compounds containing cations selected from the group consisting of the alkali metals, the alkaline earth metals, the third main group, and the transition groups of the Periodic Table and/or of protonated nitrogen bases, and
the aluminum phosphite is of the formulae (II) or (III) or a combination of formula (II) with formula (I) or (III) a combination of formula (II) with formula (I) and (III) or a combination of formula (I) and (III)

$$Al_2(HPO_3)_3 x(H_2O)_q \qquad (I)$$

wherein
q is 0 to 4,

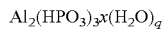

wherein
M is alkali metal ions,
z is 0.01 to 1.5,
y is 2.63 to 3.5,
v is 0 to 2 and
w is 0 to 4,

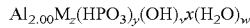

wherein
u is 2 to 2.99,
t is 2 to 0.01 and
s is 0 to 4,
mixtures of aluminum phosphite of the formula (I) with sparingly soluble aluminum salts and nitrogen-free foreign ions, mixtures of aluminum phosphite of the formula (III) with aluminum salts, mixtures of 0% to 99.9% by weight of $Al_2(HPO_3)_3 *nH_2O$ with 0.1% to 100% by weight of sodium aluminum phosphite or a combination thereof.

2. The halogen-free flame retardant mixture as claimed in claim 1, comprising 20% to 80% by weight of component A and 20% to 80% by weight of component B.

3. The halogen-free flame retardant mixture as claimed in claim 1, wherein component A comprises 92% to 99.9% by weight of aluminum diethylphosphinate and 0.5% to 8% by weight of noncombustible additions.

4. The halogen-free flame retardant as claimed in claim 1, wherein the dialkylphosphinic salts of the formula (IV) are ethyl(butyl)phosphinic salts, butyl(butyl)phosphinic salts, ethyl(hexyl)phosphinic salts, butyl(hexyl)phosphinic salts, hexyl(hexyl)phosphinic salts or a combination thereof.

5. The halogen-free flame retardant mixture as claimed in claim 1, wherein the sulfates are sodium sulfates, sodium aluminum sulfates, alunites, aluminum sulfates, calcium sulfates, cerium sulfates, iron sulfates, potassium hydrogensulfates, potassium sulfates, magnesium sulfates, manganese sulfates, monolithium sulfates, titanium sulfates, zinc sulfates, tin sulfates, zirconium sulfates, hydrates thereof or a combination thereof.

6. The halogen-free flame retardant mixture as claimed in claim 1, wherein the phosphates are aluminum phosphates, aluminum hydrogenphosphates, aluminum chloride phosphates, calcium hydrogenphosphates, calcium magnesium phosphates, calcium chloride phosphates, calcium aluminum phosphates, calcium carbonate phosphates, calcium phosphates, cerium phosphates, cerium hydrogenphosphates, lithium phosphates, lithium hydrogenphosphates, magnesium phosphates, magnesium hydrogenphosphates, potassium phosphates, potassium aluminum phosphates, potassium hydrogenphosphates, sodium hydrogenphosphates, sodium hydrate phosphates, sodium aluminum phosphates, hydrates thereof or a combination thereof.

7. The halogen-free flame retardant mixture as claimed in claim 1, wherein the phosphonates are mono($C_{1-18}$-alkyl)phosphonates, mono($C_6$-$C_{10}$-aryl)phosphonates, mono($C_{1-18}$-aralkyl)phosphonates or a combination thereof,
where the nitrates are aluminum nitrates, calcium nitrates, cerium nitrates, iron nitrates, potassium nitrates, lithium nitrates, magnesium nitrates, manganese nitrates, sodium nitrates, titanium nitrates, zinc nitrate, tin nitrates, zirconium nitrates, hydrates thereof or a combination thereof;
where the acetates are aluminum acetates, calcium acetates, cerium acetates, iron acetates, lithium acetates, potassium acetates, sodium acetates, magnesium acetates, manganese acetates, titanium acetates, zinc acetates, tin acetates, zirconium acetates, aluminum chloride acetates, aluminum hydrogenchloride acetates, hydrates thereof or a combination thereof, and
where the sulfites are potassium sulfites, potassium hydrogensulfites, potassium metabisulfites, sodium sulfites, sodium metabisulfites, sodium hydrogensulfites, ammonium sulphites, hydrates thereof or a combination thereof.

8. The halogen-free flame retardant mixture as claimed in claim 1, wherein the aluminum phosphite is a mixture of 50%-99% by weight of $Al_2(HPO_3)_3 x(H_2O)_q$, wherein q is 0 to 4 and 1% to 50% by weight of sodium aluminum phosphite.

9. The halogen-free flame retardant mixture as claimed in claim 1, wherein the aluminum phosphite is a mixture of 50% to 99% by weight of $Al_2(HPO_3)_3 x(H_2O)_q$, wherein q is 0 to 4 and 1% to 50% by weight of $Al_{2.00}M_z(HPO_3)_y(OH)_v x(H_2O)_w$ (II), wherein M is sodium, z is 0.005 to 0.15, y is 2.8 to 3.1, v is 0 to 0.4 and w is 0 to 4.

10. The halogen-free flame retardant mixture as claimed in claim 1, wherein component A has a median particle size d50 of 0.05 to 10 μm and component B a median particle size d50 of 0.05 to 10 μm and a residual moisture content of 0.05% to 8% by weight.

* * * * *